(12) United States Patent
Kumar N et al.

(10) Patent No.: US 10,412,149 B2
(45) Date of Patent: Sep. 10, 2019

(54) LOGICAL DATA OBJECT WEB SERVICES

(71) Applicant: SAP SE, Walldorf (DE)

(72) Inventors: Pradeep Kumar N, Bangalore (IN); Sreekanth K, Kottayam (IN)

(73) Assignee: SAP SE, Walldorf (DE)

( * ) Notice: Subject to any disclaimer, the term of this patent is extended or adjusted under 35 U.S.C. 154(b) by 249 days.

(21) Appl. No.: 15/375,942

(22) Filed: Dec. 12, 2016

(65) Prior Publication Data

US 2018/0167437 A1   Jun. 14, 2018

(51) Int. Cl.
*G06F 15/16* (2006.01)
*H04L 29/08* (2006.01)
*H04L 29/06* (2006.01)

(52) U.S. Cl.
CPC ............ *H04L 67/02* (2013.01); *H04L 67/141* (2013.01); *H04L 67/42* (2013.01)

(58) Field of Classification Search
CPC ................................ H04L 67/02; H04L 67/04
See application file for complete search history.

(56) References Cited

U.S. PATENT DOCUMENTS

| 2008/0189679 | A1* | 8/2008 | Rodriguez | G06F 8/34 717/105 |
|---|---|---|---|---|
| 2013/0132372 | A1 | 5/2013 | Gilbert | |
| 2014/0122679 | A1* | 5/2014 | Griffin | H04L 67/02 709/223 |

OTHER PUBLICATIONS

"Business Object Modeling," SAP Help Studio, help.sap.com, visited Dec. 9, 2016, 9 pages.
"SAP Cloud Applications Studio," SAP Developer Network, www.sdn.sap.com, Mar. 2015, 28 pages.
Schminke, "Getting Started with Business Object Processing Framework," SAP Developer Network, www.sdn.sap.com, Aug. 20, 2013, 18 pages.

* cited by examiner

*Primary Examiner* — Yves Dalencourt
(74) *Attorney, Agent, or Firm* — Klarquist Sparkman, LLP

(57) ABSTRACT

Technologies are provided for implementing logical data object (LDO) web services. A web service definition can be received that comprises a LDO view and one or more service operation definitions. A LDO web service can be generated based on the web service definition and registered with a service endpoint. Web service requests received at the registered endpoint can be processed using the LDO web service. The runtime engine can perform service operations defined in the web service definition using one or more instances of the LDO associated with the LDO service. The LDO view can include one or more custom LDO extension nodes and/or extension data elements. A design-time application can be provided that comprises a user interface for creating a LDO web service definition. The created web service definition can be transmitted to an application server where a LDO web service can be generated based on the definition.

18 Claims, 20 Drawing Sheets

FIG. 16

```
<soapenv:Envelope smlns:soapenv="http://schemas.xmlsoap.org/soap/envelope">
 <soapenv:Header/>
 <soapenv:Body>
  <OpportunityV1UpdateRequest_sync>
   <BasicMessageHeader></BasicMessageHeader>
   <Opportunity>
    <ABCTest ActionCode="01">
     <!--Optional:-->
     <ExtID>2</ExtID>
     <!--Optional:-->
     <ExtName>Ext1</ExtName>
     <!--Optional:-->
     <ExtAmount currencyCode="USD">100</ExtAmount>
    </ABCTest>
   </Opportunity>
  </OpportunityV1UpdateRequest_sync>
 </soapenv:Body>
</soapenv:Envelope>
```

```
<soapenv:Envelope smlns:soapenv="http://schemas.xmlsoap.org/soap/envelope">
  <soapenv:Header/>                                                          — 1710
  <soapenv:Body>
    <OpportunityVlABCTestActionABCTestABCTestActionRequest_sync>
      <BasicMessageHeader>        — 1720
        <!--Optional:-->          — 1722
        <ID>?</ID>
        <!--Optional:-->          — 1724
        <UUID>?</UUID>
        <!--Optional:-->          — 1726
        <ReferenceID>?</ReferenceID>
        <!--Optional:-->          — 1728
        <ReferenceUUID>?</ReferenceUUID>
      </BasicMessageHeader>
      <Opportunity>               — 1730
        <!--Optional:-->          — 1732
        <UUID>?</UUID>
        <!--Optional:-->          — 1734
        <ID>?</ID>
        <!-- 1 or more repetitions:-->
        <ABCTest>
          <!--Optional:-->        — 1740
          <UUID>?</UUID>          — 1742
          <!--Optional:-->
          <ExtID>?</ExtID>        — 1744
        </ABCTest>
      </Opportunity>
    </OpportunityVlABCTestActionABCTestABCTestActionRequest_sync>
  </soapenv:Body>
</soapenv:Envelope>
```

```
<soapenv:Envelope smlns:soapenv="http://schemas.xmlsoap.org/soap/envelope">
  <soapenv:Header/>
  <soapenv:Body>
    <OpportunityV1QueryByElementsABCTestSimpleByRequest_sync>
      <OpportunityABCTestSimpleSelectionBy>
      <!--Zero or more repetitions:-->
        <SelectionByExtID>
          <!--Optional:-->
          <InclusionExclusionCode>I</InclusionExclusionCode>
          <IntervalBoundaryTypeCode>1</IntervalBoundaryTypeCode>
          <!--Optional:-->
          <LowerBoundaryExtID>2</LowerBoundaryExtID>
        </SelectionByExtID>
      </OpportunityABCTestSimpleSelectionBy>
      <ProcessingConditions>
        <!--Optional:-->
        <QueryHitsMaximumNumberValue>-1</QueryHitsMaximumNumberValue>
        <QueryHitsUnlimitedIndicator>true</QueryHitsUnlimitedIndicator>
      </ProcessingConditions>
    </OpportunityV1QueryByElementsABCTestSimpleByRequest_sync>
  </soapenv:Body>
</soapenv:Envelope>
```

1800, 1810, 1820, 1830, 1832, 1834, 1836, 1840, 1842, 1844

LOGICAL DATA OBJECT WEB SERVICES

BACKGROUND

Some web applications allow users to customize application functionality by creating and/or modifying data structures that are processed by the application. Some of these customizable web applications can be configured to generate new user interface components, through which data stored in the created/modified data structures can be accessed and manipulated. However, in such applications, access to the created/modified data structures is typically limited to the use of the new application user interface components. In some scenarios, other applications might potentially benefit from access to the created/modified data structures; however, they will be unable to do so because access is limited to the user interface of the customized web application.

Therefore, there is room for improvement in technologies related to exposing and accessing web application customizations.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, a method for processing web service requests using logical data object extension nodes comprises: receiving a web service request comprising a service identifier and an operation identifier; identifying an extension node service interface associated with the service identifier; and performing an operation associated with the operation identifier using a logical data object extension node associated with the extension node service interface.

In another embodiment, one or more computer-readable media store instructions that, when executed by one or more processors, cause the one or more processors to perform a method, the method comprising: receiving a definition for a logical data object web service from a first computing device over a network; generating a logical data object web service based on the received definition; receiving a web service operation request from a second computing device over the network, wherein the web service operation request comprises a web service endpoint identifier and an operation identifier; determining that the web service endpoint identifier is associated with the logical data object web service; identifying an operation of the logical data object web service associated with the operation identifier; performing the operation of the logical data object web service using a data payload of the web service operation request; and transmitting a result of the operation in a web service response to the second computing device.

In another embodiment, a system for creating and running a web service using an extension node comprises a repository service is configured to: receive a design document comprising a definition of an extension node for a logical data object, wherein the extension node comprises one or more data elements; store the definition of the extension node in a design document store in association with at least one design document for the logical data object; and receive a web service definition identifying the extension node and defining one or more web service operations that can be performed using one or more instances of the extension node. The system further comprises a runtime engine configured to: generate an extension node web service interface based on the web service definition that supports the defined web service operations; receive a web service request comprising an endpoint identifier associated with the extension node web service interface and an operation identifier associated with one of the defined web service operations; process the web service request using the extension node web service interface, wherein the processing comprises performing the identified operation using an instance of the extension node associated with an instance of the logical data object stored in a logical data object store; and transmit a web service response comprising a result of the operation.

As described herein, a variety of other features and advantages can be incorporated into the technologies as desired.

BRIEF DESCRIPTION OF THE DRAWINGS

FIG. 16 is a diagram depicting an example web service operation request to perform an Update operation using a logical data object instance.

FIG. 17 is a diagram depicting an example web service operation request to perform an Action operation using a logical data object instance.

FIG. 18 is a diagram depicting an example web service operation request to perform a Query operation to retrieve one or more logical data object instances.

DETAILED DESCRIPTION

Example 1—Overview

Figure 1:
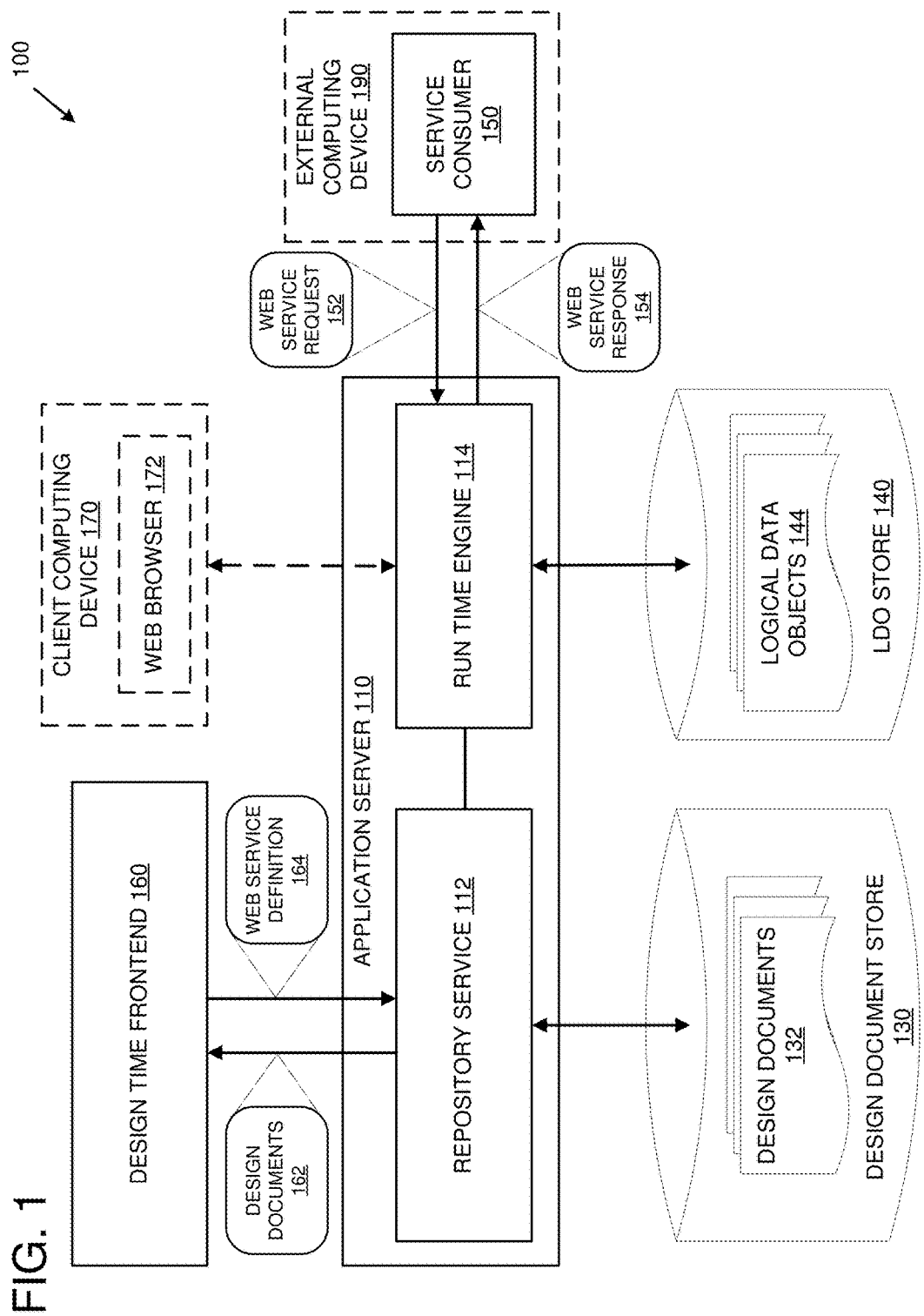
FIG. 1 is a block diagram depicting an example system for receiving logical data object web service definitions and processing web service requests.

The description provided herein is directed to defining and generating logical data object (LDO) and extension node web services and processing web service requests using the generated services.

Some customizable web applications can be configured to generate user interface components, through which data stored in created and/or modified data structures can be accessed and manipulated. However, in such applications, access to the created and/or modified data structures is typically limited to the use of the application's user interface. Customized data structures and associated logical operations are thus isolated to the application where they are defined and cannot be accessed by external applications or integrated into a broader enterprise solution. At least some of the technologies described herein address these problems by generating consumable web services based on logical data objects (LDOs) and/or extension nodes, and by processing web service requests targeting operations associated with LDOs and/or extension nodes.

Various technologies described herein can be used to create LDO web service definitions. A design-time application can be provided which comprises a user interface that can be used to create a LDO web service definition. The user interface can comprise one or more UI components that can be used to define a view of a LDO, comprising one or more nodes and/or data elements. The user interface can be used to define one or more service operations associated with the LDO view. A web service definition can be created that includes the view of the LDO and the one or more service operation definitions.

Various technologies described herein can be used to generate LDO web services. A repository service can receive a web service definition and store the web service definition in a design document store. A runtime engine can generate a LDO web service based on the received web service definition. The runtime engine can register the generated service with an externally facing service endpoint. The runtime engine can be configured to receive web service requests over the service endpoint and process the requests using the generated service.

Various technologies descried herein can be used to process web service requests using extension node service interfaces. An extension node service interface can be created by a runtime engine based on an extension node service definition. The extension node service definition can identify one or more extension nodes and/or extension data elements defined for a LDO and can define one or more service operations that can be performed using the identified one or more extension nodes and/or extension data elements. The runtime engine can be configured to process web service requests that target the defined service operations using the extension node service interface.

Example 2—System for Creating and Running LDO Web Services

In any of the examples described herein, a system can be provided or creating and running LDO web services.

FIG. 1 is a block diagram depicting an example system 100 for receiving LDO web service definitions (e.g., 164) and processing web service requests (e.g., 152). An application server 110 comprises a repository service 112 and a runtime engine 114. The repository service 112 is configured to receive a web service definition 164 from a design time front-end 160. The web service definition 164 can define one or more web service operations that can be performed using instances of a LDO, such as one of the LDOs 144 in the LDO store 140. The repository service 112 can store the web service definition 164 in a design document store 130.

The runtime engine 114 is configured to generate a logical data object web service interface based on the received web service definition 164. Generating the logical data object web service interface can comprise registering a unique endpoint identifier that is associated with the web service definition 164 with the runtime engine 114. In at least one embodiment, the identifier can be provided as part of the web service definition 164. In a different or further embodiment, the endpoint identifier can be generated entirely, or in part, by the runtime engine 114. The runtime engine 114 is configured to receive a web service request 152 from a service consumer 150. The web service request 152 can comprise the endpoint identifier that is registered with the runtime engine 114 and associated with the web service definition 164. The runtime engine 114 can determine that the endpoint identifier contained within the web service request 152 is the same endpoint identifier associated with the web service definition 164. The runtime engine 114 can then process the web service request 152 using the web service definition 164.

In one embodiment, the web service definition 164 is used by the runtime engine 114 to generate a logical data object web service that is then used by the runtime engine 114 to process the web service request 152. The runtime engine 114 can generate the logical data object web service using the web service definition 164 when the web service definition 164 is received by the repository service 112. Alternatively or additionally, the runtime engine 114 can generate the logical data object web service at a point after the web service request 152 is received. For example, the runtime engine 114, after determining that the endpoint identifier is associated with the web service definition 164, can send a request to the repository service 112 to retrieve the web service definition 164. The request can include an identifier of the web service definition 164. The repository service 112 can use the provided identifier to retrieve the web service definition 164 from the design document store 130. In a particular embodiment, all or part of the endpoint identifier is provided to the repository service 112 as the web service definition identifier.

The web service request 152 can comprise an operation identifier associated with one of the web service operations defined in the web service definition 164. The runtime engine 114 can identify a web service operation that is associated with the operation identifier and can process the web service request, at least in part, by performing the identified web service operation using one or more instances of a LDO. For example, as part of processing the web service operation, the runtime engine 114 can manipulate and/or retrieve one or more instances of one of the LDOs 144 in the LDO store 140. In at least some embodiments, instances of a LDO can be stored in the LDO store 140 in association with the LDO. In a different or further embodiment, LDO instances can be stored in one or more different data stores.

After the runtime engine 114 has finished processing the web service request 152, the runtime engine 114 can generate a web service response 154 and transmit the response 154 back to the service consumer 150. In some cases, the web service response 154 can contain a result of the web service operation. For example, in a case where the web service operation comprised retrieving one or more instances of a LDO, the web service response 154 can contain all or part of the retrieved LDO instances.

In at least one embodiment, the web service definition 164 identifies a particular LDO of the LDOs 144 in the LDO store 140. For example, a LDO can have a unique identifier and/or name that can be used to identify it. The runtime engine 114 can be configured to associate a logical data object web service generated using the web service definition 164 with the identified LDO. The runtime engine 114 can limit the scope of any web service operations to instances of the identified LDO. For example, if the web service request 152 identified an endpoint associated with the web service definition 164, but comprised a request to perform a web service operation on a LDO other than the LDO associated with the web service, the runtime engine 114 can be configured to reject the request to perform the web service operation. In a further embodiment, the web service response 154 can contain a message indicating that the web service request was not processed.

In at least some embodiment, the runtime engine 114 can be configured to generate a web service definition schema based on the web service definition 164. Service consumer 150 can transmit a request to the runtime engine 114 (not shown), requesting the web service definition schema. The web service definition schema can contain one or more endpoint identifiers associated with the web service definition 164 and/or information about web service operations defined in the web service definition 164. In a particular embodiment, the web service definition schema is a Web Service Definition Language (WSDL) schema. However, other forms of schema definitions are also possible. In one embodiment, the runtime engine 114 dynamically generates the web service definition schema using the web service definition 164 after receiving the request for the schema from the service consumer 150. In a different or further embodiment, the runtime engine 114 can generate the web service definition schema upon receipt of the web service definition 164 by the repository surface 112.

The service consumer 150 can be configured to dynamically generate one or more web service access modules based on the web service definition schema. In at least one embodiment, one of the one or more web service access modules is used by the service consumer 150 to transmit the web service request 152 and/or to receive the web service response 154.

Optionally, the service consumer 150 can be part of an external computing device 190 that is configured to communicate with the application server 110 over a network. Although a single service consumer 150 is depicted, the runtime engine 114 can be configured to receive and process web service requests from multiple service consumers on one or more different computing devices.

Optionally, the example system 100 can comprise a client computing device 170 comprising a web browser 172. The runtime engine 114 can be configured to receive web requests, such as requests using the hypertext transfer protocol (HTTP), from the web browser 172 and to process those requests using one or more instances of one or more of the LDOs 144 and/or one or more of the design documents 132. In such an embodiment, the logical data object web service generated based on the web service definition 164 can provide an alternative means of accessing the same one or more LDOs. For example, instead of interacting with the runtime engine 114 using the web browser 172 on the client computing device 170, the service consumer 150 can be used to incorporate behavior encapsulated in the web service operations of the logical data object web service into one or more external applications.

The design time frontend 160 can be used to generate the web service definition 164. The design time frontend 160 is configured to retrieve one or more design documents 162, of the design documents 132 in the design documents store 130, from the repository service 112. The design documents 162 can comprise metadata defining one or more of the LDOs 144 and/or operations that can be performed using the LDOs 144. The design time frontend 160 can comprise a user interface for presenting information contained within the design documents 162 to a user and for receiving input from the user to define a logical data object web service comprising one or more web service operations to be performed using one or more instances of a LDO. The design time frontend 160 can be configured to generate the web service definition 164 based on the received user input. In a particular embodiment, the design time frontend 160 is part of a design time application running on a client computing device. In such an embodiment, the design time application can be configured to communicate with the application server 110 over a computer network using a network interface of the client computing device.

Example 3—Logical Data Object Schema

In any of the examples described herein, a logical data object (LDO) can contain a definition of a hierarchical data structure and definitions of one or more operations that can be performed using portions of the hierarchical data structure. In some cases, a LDO may be referred to as a "business object" and can take any number of forms including business intelligence or performance management components such as those implemented in software technologies of SAP BusinessObjects, ORACLE Hyperion, IBM Cognos, and others. However, the use of LDOs in computer applications is not limited to "business" scenarios. LDOs can be used to define a particular application and/or problem domain space. Aspects and artifacts of a given problem domain can be defined using the hierarchical data structure and various portions of these aspects and/or artifacts can be associated directly with definitions of relevant logical operations.

Figure 2:
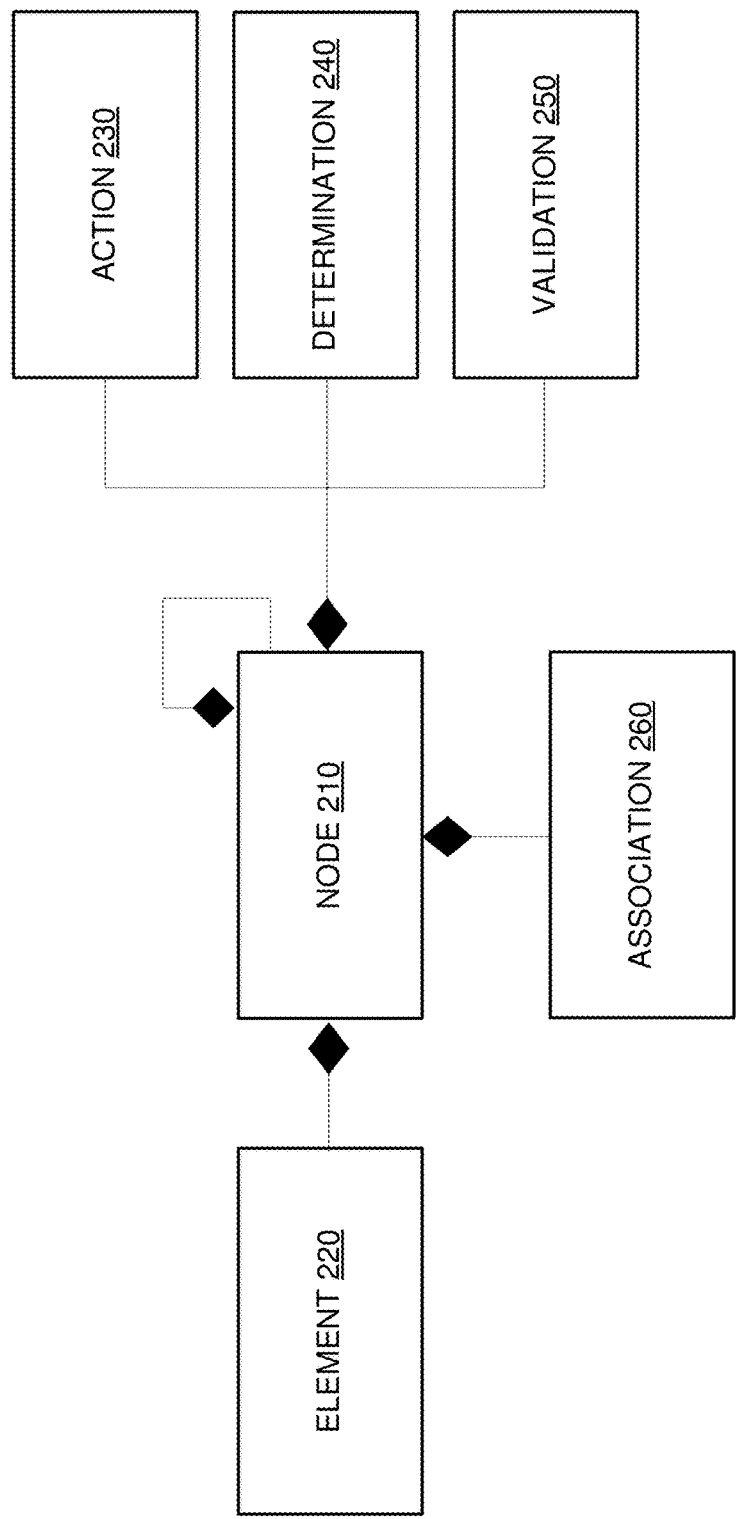
FIG. 2 is a diagram of an example logical data object schema.

FIG. 2 is a diagram of an example LDO schema 200. A node 210 can contain one or more data elements 220. A data element 220 can contain an identifier, such as a name, and an associated value. In at least some embodiments, the data element 220 can be associated with a data type that restricts and/or validates the type of data that can be stored as a value of the data element 220. The node 210 can contain one or more child nodes 210 (also referred to as sub-nodes), which can themselves contain additional data elements 220. Combinations of sub-nodes 210 and data elements 220 can be used to define a hierarchical data structure of multiple nodes 210. In at least some embodiments, the hierarchical data structure can contain a root node that does not have a parent-node and can be used as an entry point for traversing the hierarchical data structure.

Each node in the LDO can be associated with one or more actions 230. An action 230 can comprise a definition for a logical operation that can be performed using the node 210, with which it is associated. The action 230 can contain an identifier that can be used to invoke the action's logical operation. Each node in the LDO can be associated with one or more determinations 240. A determination 240 can contain a definition for a logical operation that can be automatically executed when a trigger condition is fulfilled. Example trigger conditions can include a modification of the associated node 210, a modification of the data element 220 of the associated node 210, the creation of a data element 220 of the associated node 210, etc. A logical operation defined by an action 230, or a determination 240, can comprise instructions to create, update, read, and/or delete one or more data elements 220 and/or one or more sub-nodes.

Each node in the LDO can be associated with one or more validations 250. A validation 250 can contain a definition of one or more data integrity rules and/or checks. The one or more data integrity rules and/or checks can be performed when the associated node 210, and/or one or more data elements 220 of the associated node 210, are created, modified, and/or deleted. Any such operation that does not satisfy the one or more data integrity rules and/or checks can be rejected.

Each node in the LDO can be associated with one or more nodes from one or more other LDOs by one or more associations 260. An association 260 can contain an identifier for a node in another LDO that is associated with the node 210. Associations 260 can be used to define relationships among nodes in various LDOs. The Association 260, in at least some embodiments, contains an association type indicator that identifies a type of association between the node 210 and the node in the other LDO.

Although the action 230 as defined and associated with the node 210, when the action 230 is invoked, it targets an identified instance of the node 210 with which it is associated. Similarly, a determination 240 and/or validation 250 can be defined and associated with a node 210, but can target an instance of the associated node 210 when it/they is/are invoked. Multiple instances of a given LDO can be created and accessed independently of one another. Although the instances of the LDO share a common schema, the data values stored in their respective node instances and data element instances can differ, as can the LDO instances that are associated by the associations 260. Additionally or alternatively, an instance of an association 260 can identify a particular instance of an associated node in another LDO instance. The identifier of a node instance can be an alphanumeric string that uniquely identifies the instance and, in at least some cases, can be used to look the instance up and/or retrieve data associated with the instance. Particular examples of identifiers include numerical values and universally unique identifiers. However, other types of identifiers are also possible.

Example 4—Method for Creating and Operating a LDO Web Service

Figure 3:
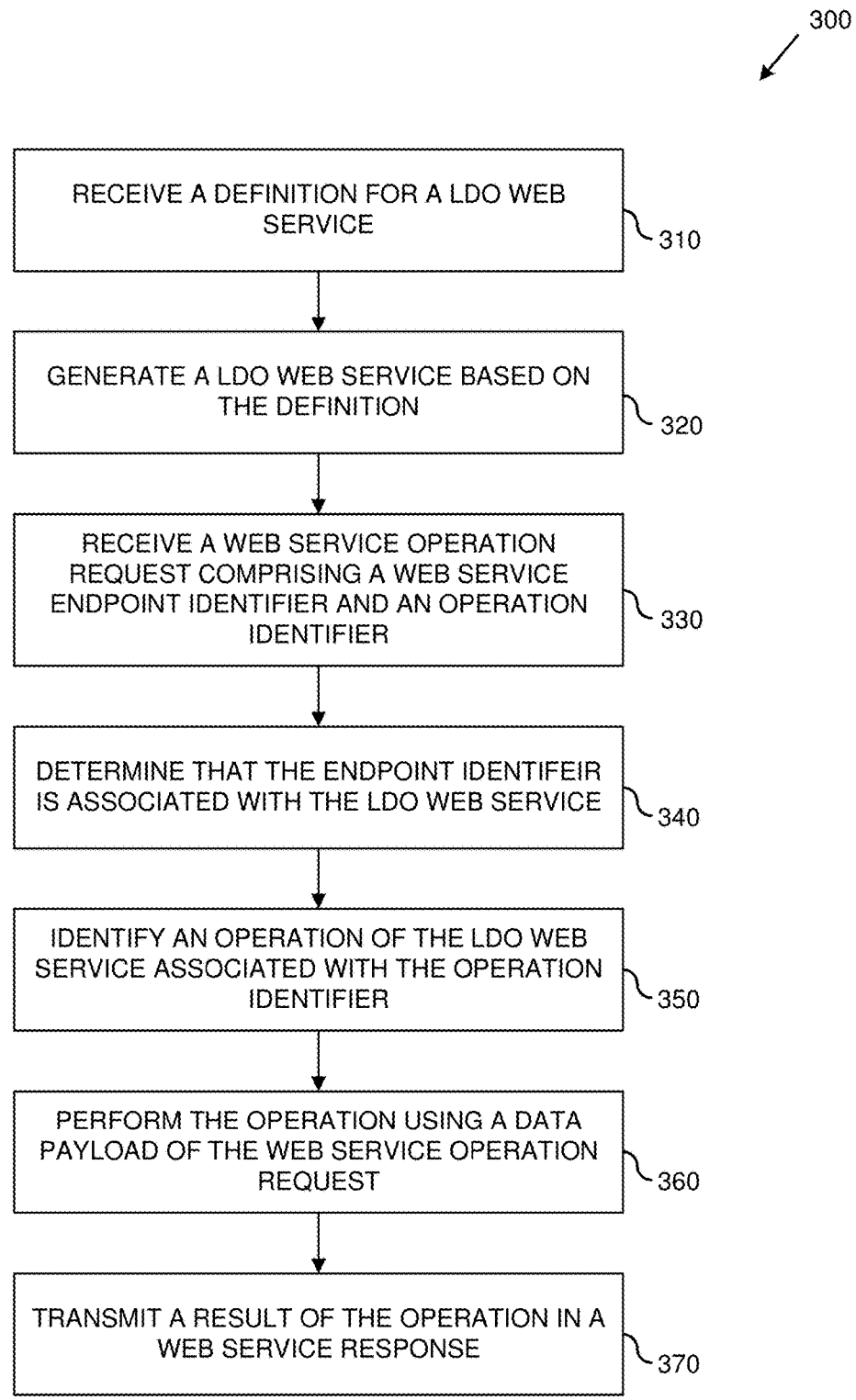
FIG. 3 is a flowchart depicting an example method for generating a logical data object web service and processing web service requests using the service.

FIG. 3 is a flowchart depicting an example method 300 for generating a LDO web service and processing a web service request using the service. Any of the example systems described herein can be used to perform the example method 300.

At 310, a definition for a LDO web service is received. The LDO web service definition can identify a particular LDO associated with the web service. The identified LDO can be stored in a data store along with one or more instances of the LDO. The LDO web service definition can comprise one or more definitions for service operations. In one embodiment, one or more of the service operation definitions can comprise declarative instructions for performing the one or more operations using one or more instances of the identified LDO. For example, an operation definition may identify a built-in data manipulation operation and include one or more values to be passed in as parameters to the built-in data manipulation operation. In a different or further embodiment, one or more of the service operation definitions can comprise imperative instructions. For example, an operation definition may include one or more instructions written in an imperative programming language. Example service operation definitions include definitions for operations to create, read, update, and/or delete LDO instances. Example service operation definitions can further include definitions for operations to perform user defined actions and/or operations to execute queries. In some embodiments, the definition of the LDO web service can identify a subset of nodes and/or data elements contained within a particular LDO. The identified subset of nodes and/or data elements can be used to constrain the scope of the one or more operations.

At 320, a LDO web service is generated based on the received definition. Generating a LDO web service can comprise processing the one or more operation definitions in the LDO web service definition and creating one or more objects for use in performing the one or more service operations. In an embodiment where an operation definition comprises imperative instructions for performing a given operation, processing the operation definition can comprise interpreting and/or compiling the definition instructions to create one or more executable modules that, when executed, perform the operation. In an embodiment where an operation definition comprises declarative instructions that identify a built-in operation, one or more pre-existing executable modules may be associated with the built-in operation. In such an embodiment, the service operation can comprise a metadata representation that identifies the built-in operation and includes any parameter values included in the operation definition. In an embodiment where the LDO web service definition identifies a subset of nodes and/or data elements contained in the LDO, the generated LDO web service's access to the LDO can be limited to the identified subset of nodes and/or data elements. The generated LDO web service can be registered with a runtime engine that is configured to receive web service operation requests.

At 330, a web service operation request operation is received comprising a web service endpoint identifier and an operation identifier. The web service operation request can be received by a runtime engine with which the LDO web service is registered. In at least some embodiments, the web service operation request is received via a communication network using a web service protocol, such as the Simple Object Access Protocol (SOAP) or REpresentational State Transfer (REST). The endpoint identifier can comprise a unique identifier associated with the web service and/or a unique identifier associated with a server hosting the web service. In a particular embodiment, the endpoint identifier comprises a Uniform Resource Locator (URL), or a part of a URL. The operation identifier can comprise an identifier associated with the service operation in the web service definition, an identifier created for a service operation during the generation of the LDO web service, or some combination thereof.

At 340, a determination is made that the endpoint identifier is associated with the LDO web service. A runtime engine with which the LDO web service is registered, and which receives the web service operation request, can determine that the endpoint identifier is an identifier for the LDO web service. Alternatively, the runtime engine can parse the endpoint identifier to extract a part of the endpoint identifier and determined that the part of the endpoint identifier is associated with the LDO web service. In a particular example, the endpoint identifier comprises a URL and a portion of the URL is an identifier associated with the LDO web service. In some cases, more than one LDO web service is registered with the runtime engine. The runtime engine can maintain a look up table that associates service identifiers with the registered LDO web services. The endpoint identifier (or part of the endpoint identifier) can be compared to entries in the look up table to identify the LDO web service associated with the endpoint identifier.

At 350, an operation of the LDO web service associated with the operation identifier is identified. In at least some embodiments, the operation identifier is provided by one or more fields of the web service operation request. In a different or further embodiment, all or part of the operation identifier is contained in a URL of the web service operation request. A runtime engine with which the LDO web service is registered can extract the operation identifier from the web service operation request and locate an operation of the LDO web service that is associated with the operation identifier. In at least some embodiments, the operation identifier can comprise a unique identifier associated with the operation that is provided by the LDO web service definition. In a different or further embodiment, the operation identifier indicates an operation type of the requested operation.

At 360, the operation is performed using a data payload of the web service operation request. The data payload of the web service operation request may comprise one or more pieces of data. The contents of the data payload can vary based on the type of service operation that is requested. If the requested operation is a Create operation, the data payload may contain one or more values to be assigned to data element instances of a new LDO instance. Optionally, the data values may be organized into nodes and sub-nodes according to a schema of a LDO associated with the LDO web service. Processing a Create operation request can comprise creating one or more new LDO instances in a data store using the provided data values. If the requested operation is a Read operation, the data payload may contain a unique identifier associated with a LDO instance to be retrieved. Processing a Read operation request can comprise searching for an instance of the LDO associated with the LDO web service that is associated with the provided unique identifier in a data store, and retrieving all or part of a matching LDO instance's data from the data store. If the requested operation is an Update operation, the data payload may contain one or more values to be assigned to data element instances of an existing LDO instance. The data payload may also contain a unique identifier associated with the LDO instance to be updated. Processing an Update operation request can comprise searching for a LDO instance in a data store associated with the provided unique identifier and updating the matching LDO instance with the provided data values. If the requested operation is a Delete operation, the data payload may contain a unique identifier associated with a LDO instance to be deleted. Processing a Delete operation request can comprise searching a data store for a LDO instance associated with the provided unique identifier and deleting a matching LDO instance (or marking a matching LDO instance as deleted). If the requested operation is an Action operation, the data payload may contain an identifier associated with a requested action. Optionally, the data payload can contain one or more parameters to be provided to the requested action. Processing an Action operation request can comprise locating an action associated with the provided identifier and invoking the action (optionally passing in any provided parameter values). If the requested operation is a Query operation, the data payload may contain a query identifier and/or one or more predicate values to be provided to an identified query. Processing a Query operation request can comprise locating the identified query in a data store using the provided identifier, executing it (optionally passing in any provided parameter values), and retrieving one or more LDO instance results returned by the query.

In any of the example operations described herein, parameter values can be provided by an associated service operation definition. For example, rather than (or in addition to) being provided as part of the web service operation request payload, identifiers, data values, and/or parameter values can be provided as part of an operation definition in the LDO web service definition. When processing a requested operation, any such identifiers, data values, and/or parameter values can be retrieved from an associated operation definition and provided to the operation instead of (or in addition to) the data payload values.

At 370, a result of the operation is transmitted in a web service response. In an embodiment where the web service operation request is received over a communication network using a web service protocol, the web service response can be transmitted over the communication network using the same protocol or different web service protocol. The result of the operation can vary depending on the type of operation that was performed. If the operation is a Create operation, the operation result may comprise a unique identifier of a newly created LDO instance. If the operation is a Read operation, the operation result may comprise data for one or more LDO instances that were identified in the web service operation request payload. If the operation is an Update operation or a Delete operation, the operation result may comprise a status message indicating whether or not one or more LDO instances identified in the web service operation request payload was/were updated/deleted. If the operation is a Query operation, one or more LDO instance query results may be included in the operation result. A LDO instance query result can comprise one or more data element instances of a LDO instance that satisfied query criteria of the executed query. If the operation is an Action operation, the contents of the operation result may be dictated by the behavior of the performed action. Action operations can be used to perform various tasks, such as retrieving LDO instances, modifying LDO instances, aggregating LDO instance data values, providing return messages based on various rule checks, etc.

In at least one embodiment, the example method 300 further comprises receiving an extension node definition for a LDO. The extension node definition can be processed to add one or more extension sub-nodes and/or extension data elements to the LDO. In such an embodiment, the operation of the LDO web service performed at 360 can be performed using one or more of the extension sub-nodes and/or extension data elements.

Example 5—System for Processing Web Service Requests with LDO Services

Figure 4:
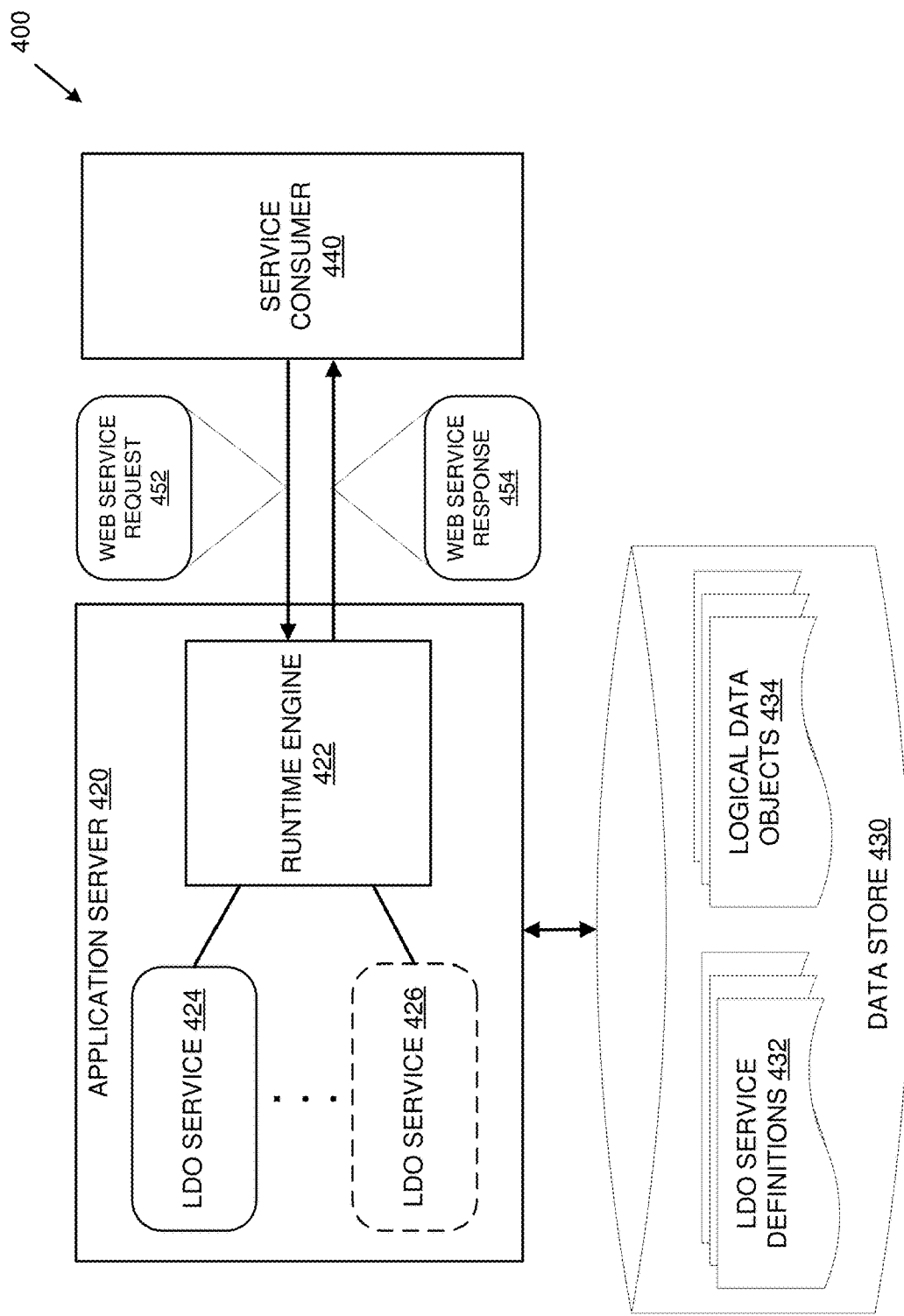
FIG. 4 is a block diagram depicting an example system for processing web service requests using one or more logical data object services.

FIG. 4 is a block diagram depicting an example system 400 for processing web service requests (e.g., 452) using one or more LDO services 424-426. An application server 420 comprises a runtime engine 422 and the one or more LDO services 424-426. The runtime engine 422 is configured to receive the web service request 452 from a service consumer 440. The runtime engine 422 is configured to identify one of the LDO services 424-426 for processing the web service request 452 and to process the web service request 452 using one or more operations of the identified LDO service. For example, the web service request 452 can comprise a web service identifier that is associated with a given LDO service of the LDO services 424-426. The web service request 452 can also contain a web service operation identifier that it is associated with an operation defined on the identified LDO service. The runtime engine 422 can locate the identified operation definition and process the request 452 according to the operation definition. In at least one embodiment, each of the LDO services 424-426 can be associated with a logical data object of the logical data objects 434 in a data store 430. In such an embodiment, processing the web service request 452 can comprise performing the identified operation on one or more instances of the logical data object associated with the identified LDO service. For example, the web service request 452 can comprise a data payload that, in addition to identifying the requested operation, contains identifiers for one or more LDO instances stored in the data store 430. The runtime engine 422 can be configured to access and/or retrieve the identified LDO instances in the data store 430 and to perform the requested operation using the identified LDO instances. After the requested operation has completed, the runtime engine 422 can transmit a web service response 454 to the service consumer 440.

In at least one embodiment, the LDO services 424-426 are generated based on LDO service definitions 432 stored in the data store 430. In LDO service definition can identify a LDO of the LDOs 434 and can contain a definition of one or more web service operations that can be performed using one or more instances of the identified LDO. In a further embodiment, the LDO service definition can identify one or more users authorized to access an operation of the LDO service. In such an embodiment, the web service request 452 can contain a user identifier, such as a unique character string, associated with a particular user. The runtime engine 422 can determine whether the user associated with the user identifier is one of the authorized users before performing the requested web service operation. If the user identifier is associated with one of the authorized users, then the runtime engine 422 can perform the requested operation. However if the user identifier is not associated with an authorized user (or if a user identifier is not provided) then the runtime engine 422 can reject the web service request, and may not perform the requested operation.

In a particular embodiment, the web service request 452 is transmitted by the service consumer 440 to the application server 420 over a network using a web service protocol, such as SOAP or REST. In a different or further embodiment, a user can be identified by providing a user identifier and password as part of the request. For example, if the request 452 is transmitted using the HTTP protocol, HTTP Basic Authentication can be used to verify an identity of the user. However, other protocols and/or identification methods are also possible. Additionally, in an embodiment where the request 452 is transmitted using the HTTP protocol, the web service identifier associated with a LDO service can comprise a URL, or part of a URL, that is mapped by the runtime engine 422 to a particular LDO service.

Various techniques are possible for instantiating the LDO services 424-426. In one embodiment, a LDO service is instantiated dynamically by the runtime engine 422 upon receipt of the web service request 452. For example, the runtime engine 422 can identify a LDO service definition associated with a service identifier contained within the web service request 452. The runtime engine 422 can then retrieve the identified LDO service definition from the data store 430 and generate a LDO service (such as the LDO service 424) based on the retrieved LDO service definition. The runtime engine 422 can then process the request 452 using the instantiated LDO service. Alternatively, the runtime engine 422 can be configured to instantiate the LDO services 424-426 prior to receipt of the web service request 452, such as upon start-up of the application server 420. The application server 420 can contain a configuration that identifies one or more of LDO service definitions 432. The runtime engine 422 can inspect the configuration, retrieve the identified LDO service definitions from the data store 430, and instantiate the LDO services 424-426 based on the retrieved LDO service definitions.

Instantiating a LDO service by the runtime engine 422 can comprise processing one or more operation definitions defined in the LDO service definition and creating one or more object instances for use by the runtime engine 422 to process web service requests targeting the LDO service definition. In at least one embodiment, an operation definition comprises imperative instructions for performing a given operation. In such an embodiment, processing the operation definition can comprise interpreting and/or compiling the instructions to create one or more executable modules for performing the operation. In a different or further embodiment, an operation definition in the LDO service definition comprises metadata that identifies one or more pre-existing executable modules of the runtime engine 422 to be executed by the runtime engine 422 in order to perform the operation. In such an embodiment, the operation definition can further comprise one or more parameter values to be provided to the one or more pre-existing executable modules for performing the desired operation. In such an embodiment, the LDO service can comprise a representation of the metadata, and may not necessarily contain any additional executable modules.

Example 6—Logical Data Object and Extension Nodes

Figure 5:
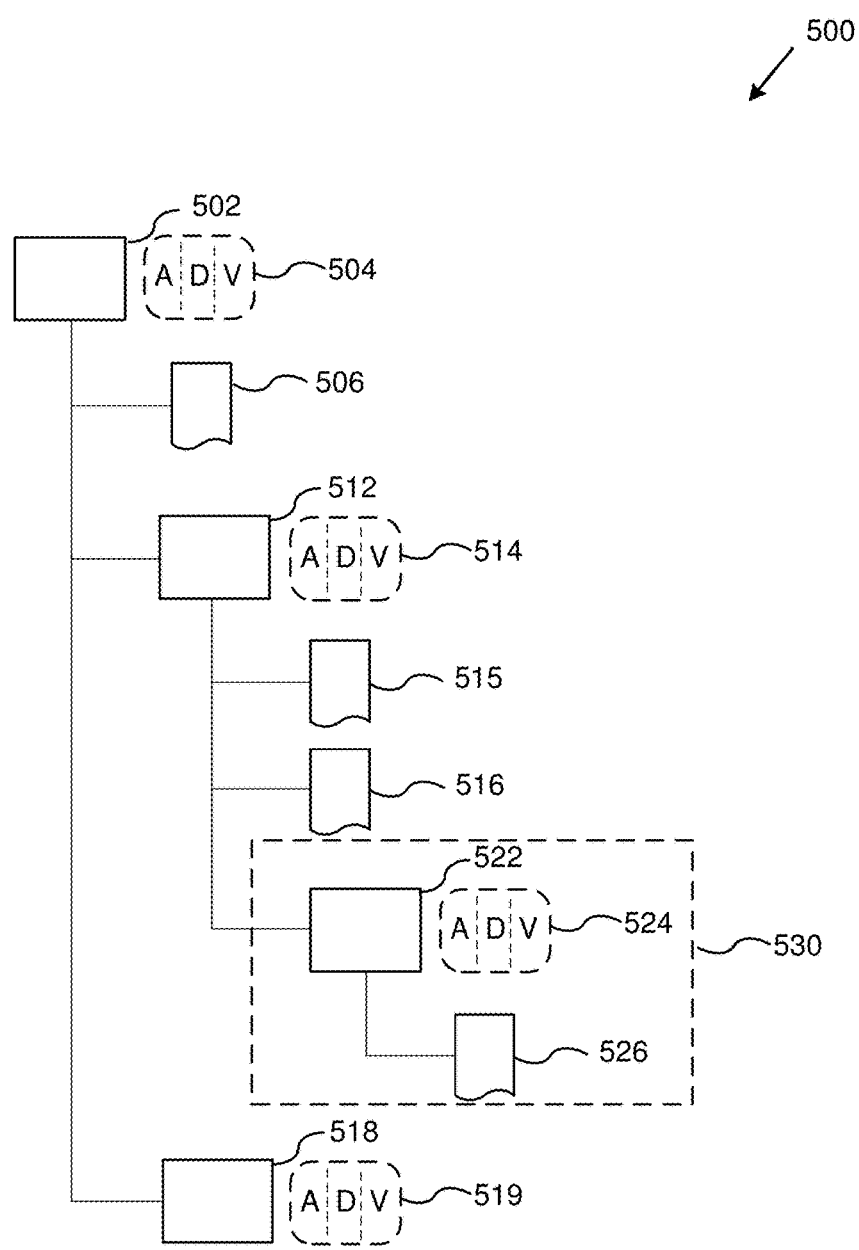
FIG. 5 is a diagram depicting an example logical data object.

FIG. 5 is a diagram depicting an example logical data object 500. The LDO 500 comprises a root node 502 which includes sub-nodes 512 and 518, and a data element 506. Optionally, the root node 504 can include one or more actions, associations, determinations, and/or validations 504. The sub-node 512 includes two data elements 515 and 516, and a sub-node 522. Optionally, the sub-node 512 can include one or more actions, associations, determinations, and/or validations 514. The sub-node 518 optionally can include one or more actions, associations, determinations, and/or validations 519. The sub-node 522 includes a data element 526, and optionally can include one or more actions, associations, determinations, and/or validations 524.

A logical data object can be extended by one or more extension node definitions. For example, LDO 500 is depicted in FIG. 5 as being extended by an extension node definition 530 which defines the sub-node 522 and data element 526. An extension node definition can be used to add additional nodes, data elements, associations, actions, determinations, and/or validations to an extension node defined in the extension node definition. In any of the example systems described herein, an application server can be configured to receive an extension node definition for a logical data object and to process the extension node definition to add one or more extension sub-nodes and/or extension data elements to the logical data object. In some cases, access to the extension sub-nodes and/or extension data elements can be restricted to one or more users and/or groups of users.

In at least one embodiment, a default LDO can be provided as part of a computing system. The LDO can then be customized by users of the system by adding one or more extension nodes and/or extension data elements to the default LDO. Using techniques described herein, the extension nodes and/or extension data elements (and optionally other nodes and/or data elements) of the LDO can be exposed via extension node web services.

Example 7—LDO Extension Node Web Service

Figure 6:
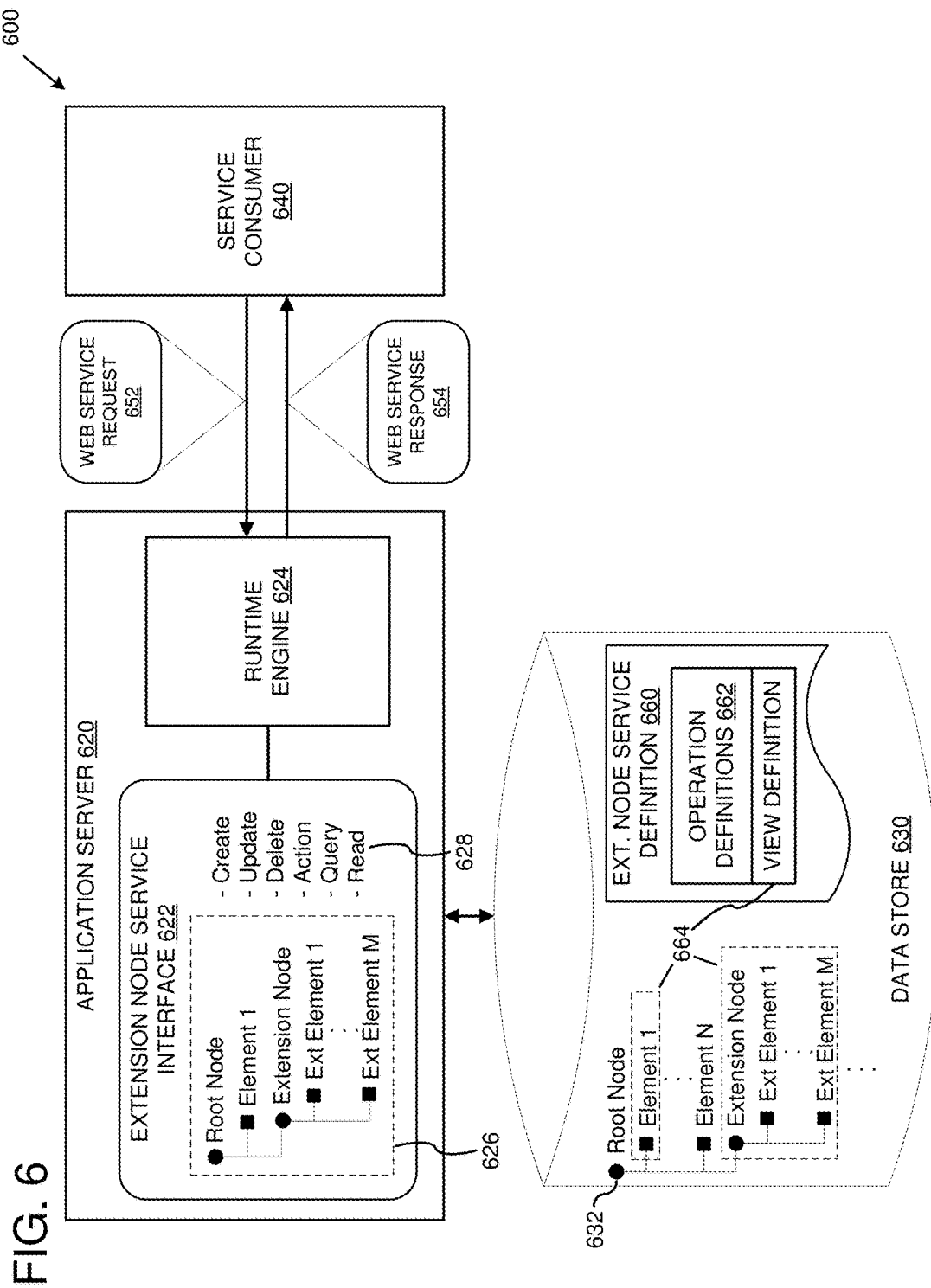
FIG. 6 is a system diagram depicting an example system for processing a web service request using an extension node service interface.

FIG. 6 is a system diagram depicting an example system 600 for processing a web service request 652 using an extension node service interface 622. The example system 600 comprises an application server 620, a data store 630, and a service consumer 640. The application server 620 comprises a runtime engine 624 and an extension node service interface 622. The runtime engine 624 is configured to receive the web service request 652 from the service consumer 640 and to process the request 652 using the extension node service interface 622.

The extension node service interface 622 comprises operation identifiers 628 and a LOD view 626. The runtime engine 624 can use the extension node interface 622 to perform operations identified by the web service request 652. The operation identifiers 628 can be used by the runtime engine to determine an operation to be performed. The list of operation identifiers 628 indicate that the extension node service interface 622 can be used to perform create, update, delete, action, query, and/or read operations on a subset of the nodes and data elements of a logical data object identified by the LDO view 626. This particular list of operation identifiers is provided for illustration purposes. Other combinations of operation identifiers are also possible. Multiple operations of a given operation type can also be provided. For example, multiple create operations with different identifiers can be provided. Similarly, multiple update operations, multiple action operations, multiple query operations, multiple read operations and/or multiple delete operations can be provided.

The extension node service interface 622 is based on an extension node service definition 660 in the data store 630. The operation identifiers 628 reference operations defined in operation definition 622 of the extension node service definition 660. The LDO view 626 is based on a view definition 664 of the extension node service definition 660. The view definition 664 is a definition of a view of the logical object 632 stored in the data store 630. Operations of the extension node service interface 622 can be limited in scope by the LDO view 626 such that only those sub-nodes and data elements identified by the LDO view are accessible by operations 628. For example, the web service request 652 may identify one or more data elements and/or sub-nodes of the logical data object instance that are a target of an identified operation. Prior to performing the identified operation, the runtime engine 624 can determine whether the targeted one or more data elements and/or sub-nodes are included in the LDO view 626. If they are included in the LDO view 626, the runtime engine 624 can allow the operation to be performed. If they are not included; however, the runtime engine 624 can prevent the requested operation from being performed.

The extension node service definition 660 can be received from a design time client computing device (not shown). The application server 620, upon receipt of the extension node service definition 660, can generate the extension node service interface 622 using the extension node service definition 660. The application server 620 can store the extension node service definition 660 in the data store 630. Generating the extension node service interface 622 can comprise creating one or more interface operations based on the operation definition 662. The interface operations can be associated with the operation identifiers 628. In one embodiment, an operation definition can comprise the definition of one or more executable modules that is used by an associated interface operation to perform the identified operation. In a different or further embodiment, an operation definition can identify a module of the runtime engine 624 (and/or a module of a computer application framework referenced by the runtime engine 624). In such an embodiment, the identified module can be used to perform the interface operation. In a further embodiment, the operation definition can comprise one or more parameter definitions that define parameter values to be passed into the identified module when it is executed as part of the interface operation.

In at least one embodiment, the operation definitions 662 can further limit the scope of one or more operations to a subset of the nodes and/or data elements included in the view definition 664. For example, a definition for an update operation may limit data that can be provided to the update operation to values for less than all of the data elements included in the view definition 664.

The view definition 664 identifies a data element, element 1, that is a child of a root node of the LDO 632 and an extension node that is defined as a sub-node of the root node of LDO 632 and comprises extension data elements 1-M. Requests, such as web service request 652 can be limited in scope to the element 1 and/or the extension node of the LDO object 632. The identified operations can be performed on one or more instances of the LDO 632. The one or more instances of the LDO 632 may be stored in the data store 630 and/or in one or more different storages. After an operation identified by the web service request 652 has been processed by the runtime engine 624, the runtime engine 624 can transmit a result of the operation to the service consumer 640 in a web service response 654.

Although a single extension node service interface 622 is depicted in FIG. 6, the runtime engine 624 can be configured to access multiple extension node service interfaces to process multiple different web service requests.

Figure 7:
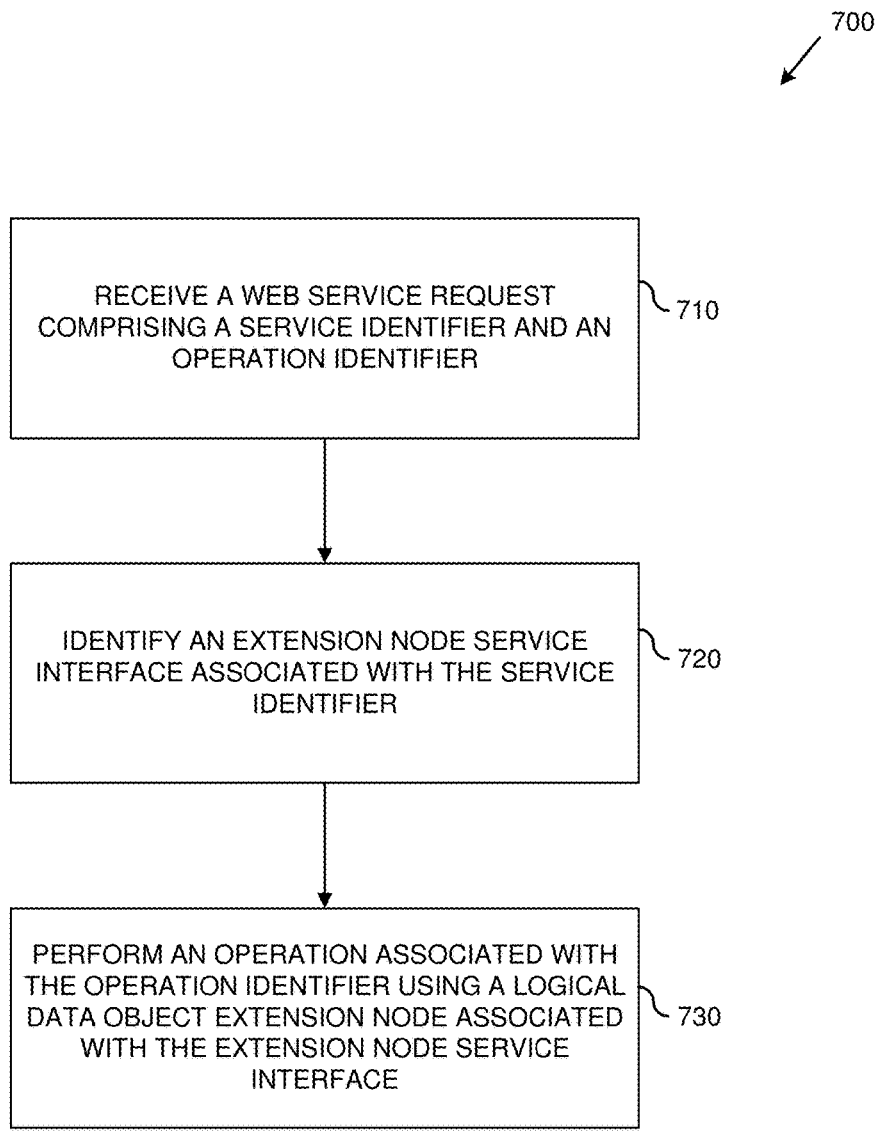
FIG. 7 is flowchart depicting an example method for processing web service requests using an extension node service interface.

FIG. 7 is a flowchart depicting an example method 700 for processing web service requests using an extension node service interface. Any of the example systems described herein can be used to perform the example method 700, however reference is made to the example system 600 depicted in FIG. 6 for illustration purposes. At 710, a web service request comprising a service identifier and an operation identifier is received. For example, the runtime engine 624 can inspect the web service request 652 to extract an extension node service interface identifier and an operation identifier from the web service request 652. In one embodiment, the extension node service interface identifier can be an identifier for a web service endpoint, such as a URL, that is associated with an extension node service interface. For example, the web service request 652 can target the web service endpoint registered with the runtime engine 624 and is associated with the extension node service interface 622. The operation identifier in the web service request can comprise the number, a string of characters, or some combination thereof. However, other types of operation identifiers are also possible.

At 720, an extension node service interface is identified that is associated with the service identifier. In at least one embodiment, the service identifier can be associated with the previously generated extension node service interface. For example, the runtime engine 624 can determine that the service identifier is associated with the extension node service interface 622 that is already connected to the runtime engine 624. Alternatively, a data store can be searched using the service identifier to identify an extension node service definition that is associated with the identifier. The extension node service definition can be retrieved and an extension node service interface can be dynamically generated based on the definition. A combination of these techniques is also possible. For example, a runtime engine can search for a previously loaded extension node service interface associated with the service identifier, and can search a data store (such as data store 630) for an extension node service definition if a previously loaded extension node service interface was not located.

At 730, an operation is performed that is associated with the operation identifier using a LDO extension node associated with the extension node service interface. The extension node service interface can be associated with a LDO or a subset of nodes and/or data elements of a LDO. The LDO (or the subset of nodes and/or data elements of the LDO) comprises an extension node. The extension node service interface further comprises one or more operation identifiers that identify operations that can be performed using the extension node of the LDO. The operation identifier received as part of the web service request can be compared to the operation identifiers in the extension node service interface to determine if one of the supported operation identifier matches the requested operation identifier. For example, the extension node service interface 622 comprises the LDO view 626 which includes the extension node of the LDO 632. The runtime engine 624 can compare the operation identifier retrieved from the web service request 652 to the list of identifiers 628 in the extension node service interface 622. If one of the operation identifiers in the list 628 matches the requested operation identifier, the runtime engine 624 can perform the identified operation using the extension node of the LDO 632.

The web service request can contain a data payload that identifies one or more LDO instances that should be targeted by the identified operation. Instances of the LDO extension node in the identified LDO instances can be used to perform the identified operation. For example, the web service request 652 can include an operation identifier that matches the operation identifier in the list 628 for the create operation. A data payload of the web service request 652 can include values for instances of one or more of the extension data elements 1-M to be assigned to a new instance of the LDO 632. The runtime engine 624 can process the operation by creating a new instance of the LDO 632, creating an instance of the extension node in the new LDO instance, and creating new instances of the one or more extension data elements and assign them the provided values. The new instance of the LDO 632 can be created in the data store 630 or in another data storage. A unique identifier for the newly created LDO instance can be passed to the service consumer 640 in the web service response 654.

In another example, the web service request 652 can contain an operation identifier that matches and identifier in the list 628 for the update operation. The data payload of the web service request 652 can contain an identifier that uniquely identifies an instance of the LDO 632 and new values for one or more instances of the extension data elements 1-M. The runtime engine 624 can process the update operation by locating an instance of the LDO 632 using the provided identifier and assigning the new values to the one or more instances of the extension data elements 1-M. A status message indicating that the update operation was successful can be passed to the service consumer 640 in the web service response 654.

In another example, the web service request 652 can contain an operation identifier that matches an identifier in the list 628 for the delete operation. The data payload of the web service request 652 can contain one or more identifiers that uniquely identify one or more instances of the LDO 632 that are to be deleted. The runtime engine 624 can process the delete operation by searching for the identified one or more instances of the LDO 632 in the data store 630 (or in another data store) and deleting the one or more identified LDO instances when they are located (or marking the one or more identified instances as deleted). A status message indicating that the one or more identified LDO instances were successfully deleted can be transmitted to the service consumer 640 in the web service response 654.

In another example, the web service request 652 can contain an operation identifier that matches an identifier in the list 628 for the action operation. The data payload for the web service request 652 can contain an identifier for a specific action that is to be performed. The specific action can be defined in a module of the runtime engine 624, an executable module associated with the extension node service interface 622, an executable module stored in the data store 630, or some combination thereof. Optionally, the data payload of the web service request 652 can contain one or more parameter values to be passed to the identified action. An example of such a parameter is an identifier of a LDO instance, but other types of parameters are also possible. The runtime engine 624 can perform the action operation by locating the one or more executable modules associated with the identified action and executing it/them (optionally providing parameter values specified in the web service request data payload). A result of the identified action can be returned to the service consumer 640 in the web service response 654.

In another example, the web service request 652 can contain an operation identifier that matches an identifier in the list 628 for the query operation. The data payload for the web service request 652 can contain an identifier for a particular query that is to be performed the particular query can be defined, for example in the data store 630 or in another data store where one or more LDO instances are stored. Optionally, the data payload of the web service request 652 can contain one or more parameter values to be passed to the identified query. Examples of such parameters can include predicate values, result range limiters, processing time limiters, etc. The runtime engine 624 can process the query operation by invoking the identified query in the data store where it is located and pass inquiry results back to the service consumer 640 in the web service response 654. In a particular example, the identified query returns one or more LDO instances that are then passed to the service consumer 640 in the web service response 654.

In another example, the web service request 652 can contain an operation identifier that matches an identifier in the list 628 for the read operation. The data payload for the web service request 652 can contain a unique identifier associated with a particular LDO instance, such as an instance of the LDO 632. The runtime engine 624 can process the read operation by searching the data store 630 (or another data store) for the LDO instance associated with the provided unique identifier and retrieving the LDO instance once it is located. The retrieved LDO instance can be transmitted to the service consumer 640 in the web service response 654. Prior to transmitting the LDO instance to the service consumer 640, the runtime engine 624 can limit the data returned to those sub-nodes and data elements identified in the LDO view 626. Additionally or alternatively, the runtime engine 624 can limit the data retrieved from the data store 630 (or another data store) to instances of the data elements and extension node included in the LDO view 626.

Example 8—User Interface for Defining a LDO Web Service

In any of the examples described herein, a user interface can be provided for creating a definition of a LDO web service and/or extension node service.

Figure 8:
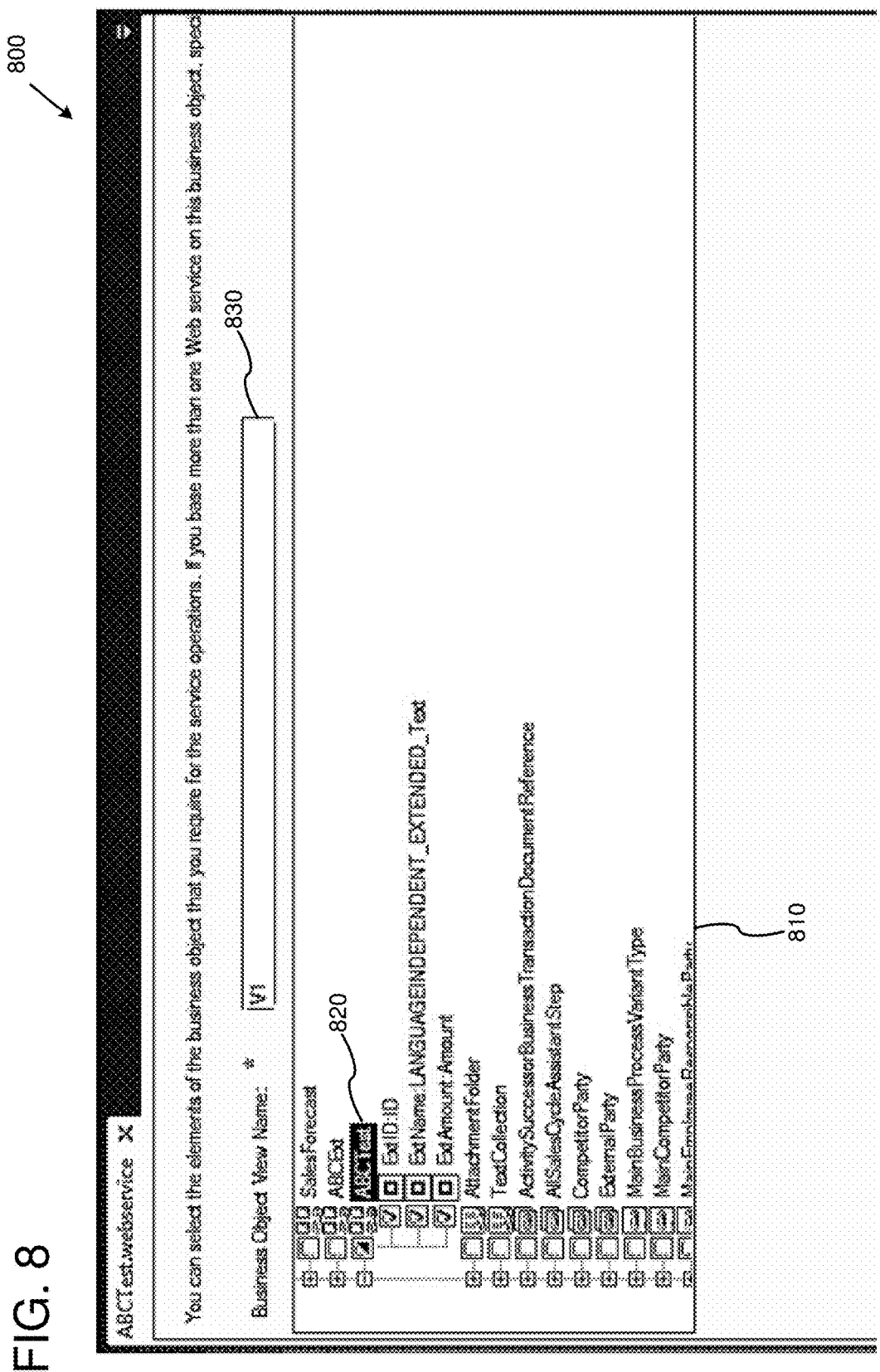
FIG. 8 is a diagram depicting an example user interface for defining a logical data object view for a web service definition.

FIG. 8 is a diagram depicting an example user interface 800 for defining a LDO view for a web service definition. The example user interface 800 includes a tree view 810 displaying sub-nodes and data elements of a LDO associated with the web service. A user can select one or more sub-nodes and/or data elements of the LDO to be included in the LDO view as part of the web service definition. For example, sub-node 820 and three data elements of the sub-node 820 are shown as being selected. In at least one embodiment, the sub-node 820 is an extension node of the LDO and the selected data elements are extension data elements. An identifier for the LDO view can be provided in the textbox 830.

Figure 9:
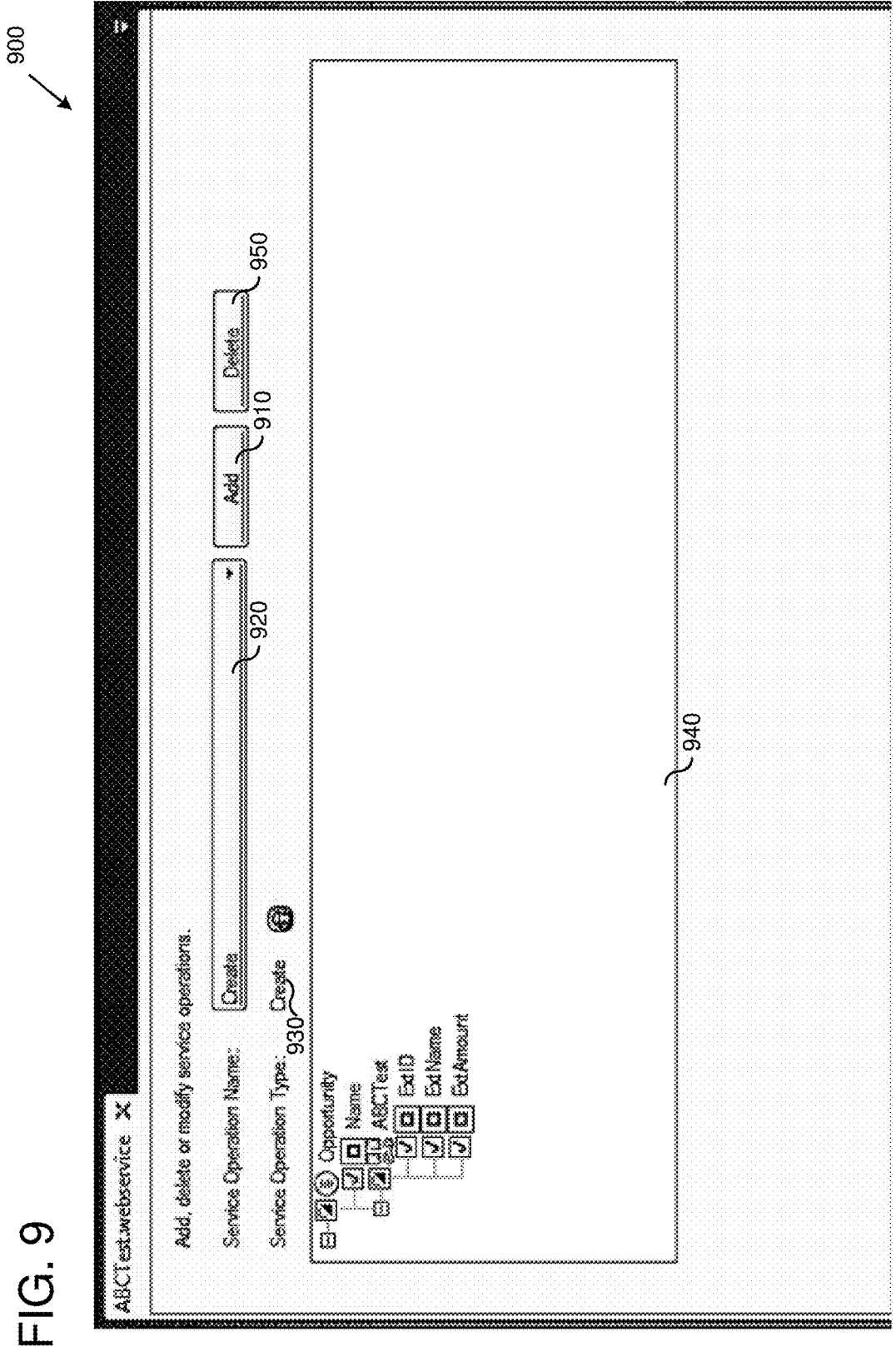
FIG. 9 is a diagram depicting an example user interface for defining a Create operation for a web service definition.

FIG. 9 is a diagram depicting an example user interface 900 for defining a Create operation for a web service definition. A button 910 can be interacted with to create a new service operation. A user interface component 920 can be used to enter and/or select a name for the new service operation. In FIG. 9, the name for the Create service operation is depicted as "Create," however, other names for the Create operation are also possible.

A label 930 indicates that the operation type of the new service operation is a Create operation. A tree view 940 depicts a subset of nodes and data elements of a LDO that are included in a LDO view associated with the web service definition. In FIG. 9, the tree view 940 is depicted as including a "Name" data element of an "Opportunity" LDO and an extension node "ABCTest" of the "Opportunity" LDO, which includes three extension data elements. A user can select nodes and/or data elements in the tree view 940 to indicate which nodes and/or data elements included in the LDO view can be provided in a data payload of a web service requests that targets the Create operation. In a particular embodiment, all data elements included in the LDO view are selected by default. In a different or further embodiment, one or more data elements included in the LDO view may be excluded from the tree view 940. For example, the LDO view may include a unique identifier field whose value is automatically set when a new LDO instance is created. Such a unique identifier field may be omitted from the tree view 940 if a predefined rule prevents a user from providing a value for the unique identifier field.

Optionally, the user interface component 920 can be used to select a pre-existing operation definition. If a pre-existing operation definition is selected, the label 930 and tree view 940 can be updated to display properties of the selected operation definition. A button 950 can be interacted with to delete an operation definition that is currently selected.

Figure 10:
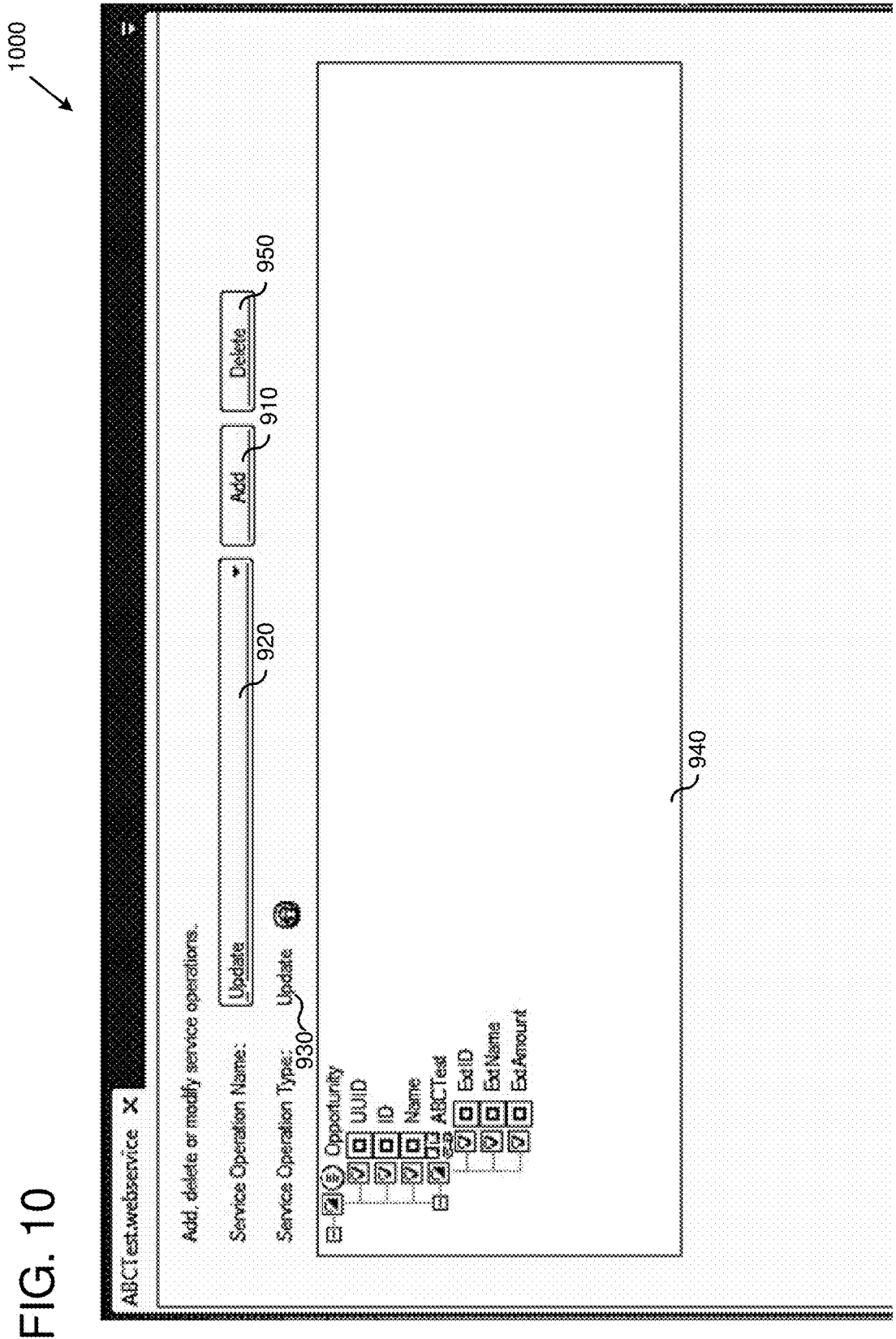
FIG. 10 is a diagram depicting an example user interface for defining an Update operation for a web service definition.

FIG. 10 is a diagram depicting an example user interface 1000 for defining an Update operation for a web service definition. The label 930 indicates that the type of the service operation is an Update operation. The tree view 940 depicts the subset of nodes and data elements of the LDO that are included in the LDO view associated with the web service definition. A user can select nodes and/or data elements in the tree view 940 to indicate which nodes and/or data elements included in the LDO view can be provided in a data payload of a web service requests that targets the Update operation. In this way, the Update operation definition can restrict the data elements that can be updated by the Update operation. In a particular embodiment, all data elements included in the LDO view are selected by default. In a different or further embodiment, one or more data elements included in the LDO view may be excluded from the tree view 940. For example, the LDO view may include a data element whose value indicates an identity of a user who created and/or last updated a LDO instance. Such a data element may be omitted from the tree view 940 if a predefined rule prevents a user from providing a value for it.

Figure 11:
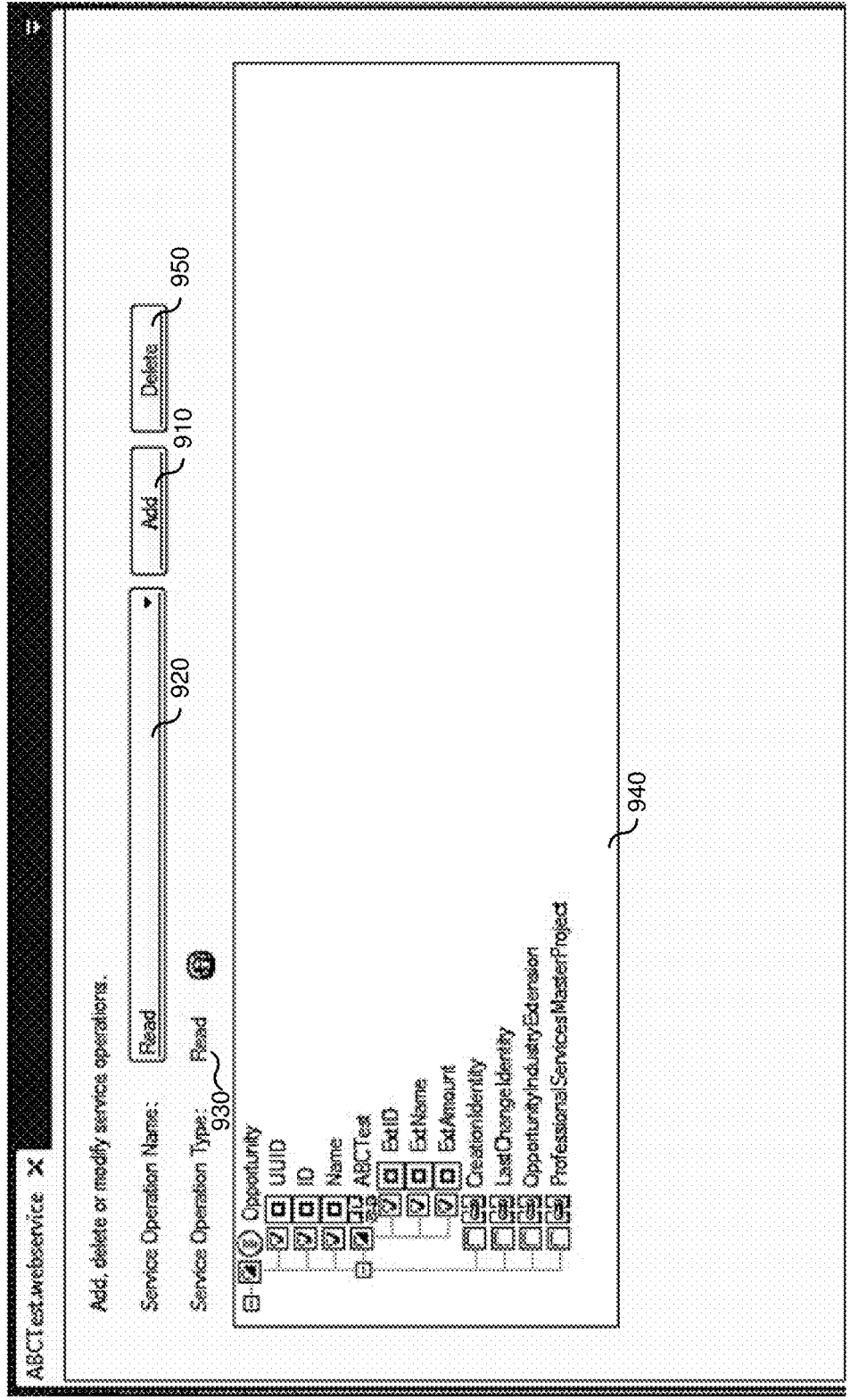
FIG. 11 is a diagram depicting an example user interface for defining a Read operation for a web service definition.

FIG. 11 is a diagram depicting an example user interface 1100 for defining a Read operation for a web service definition. The label 930 indicates that the type of the service operation is a Read operation. The tree view 940 depicts the subset of nodes and data elements of the LDO that are included in the LDO view associated with the web service definition. A user can select nodes and/or data elements in the tree view 940 to indicate which nodes and/or data elements included in the LDO view can returned in response to a web service request that targets the Read operation. In a particular embodiment, all data elements included in the LDO view are selected by default. In a different or further embodiment, multiple Read operations ca be defined that return different subsets of the nodes and/or data elements included in the LDO view.

Figure 12:
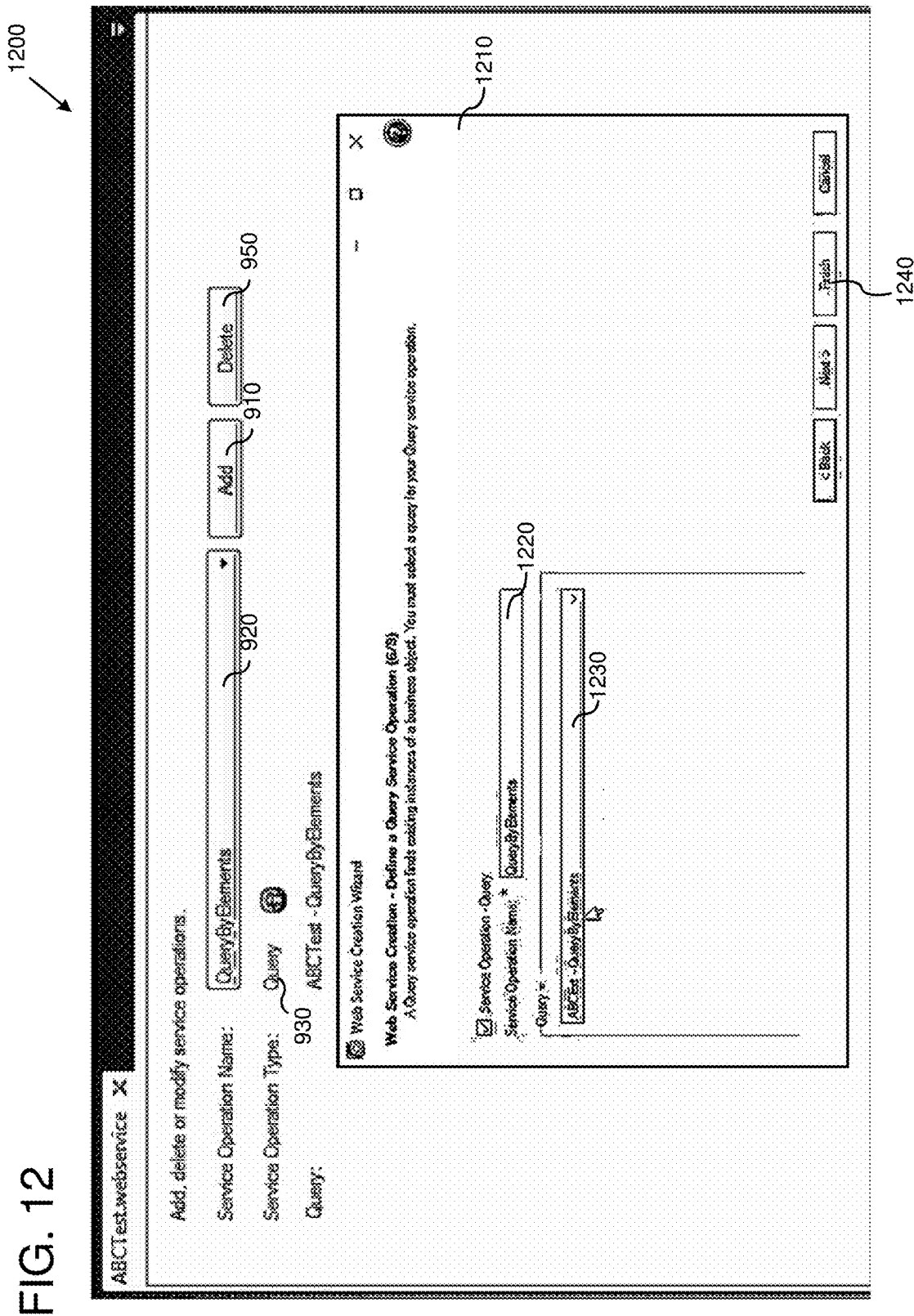
FIG. 12 is a diagram depicting an example user interface for defining a Query operation for a web service definition.

FIG. 12 is a diagram depicting an example user interface 1200 for defining a Query operation for a web service definition. The label 930 indicates that the type of the service operation is a Query operation. A dialog window 1210 comprises user interface components for providing a name for the Query operation and for selecting a query to be associated with the Query operation. A textbox 1220 can be used by a user to enter a name for the Query operation. A drop-down list 1230 can be used by a user to select a query to be executed when the Query operation is invoked. The drop-down list 1230 can be populated with a list of queries stored in a query repository. The query repository can contain one or more query definitions written in a declarative language (such as the Structured Query Language) and/or an imperative programming language (such as JAVA, JAVASCRIPT, etc.). The selected query can be executed by a runtime engine and/or a database management system with access to the query repository and a data store containing one or more LDO instances. In a particular embodiment, the selected query is configured to retrieve data for one or more LDO instances from the data store based on one or more parameters that are provided in a data payload of a web service request. A button 1240 can be interacted with by a user to save the Query operation definition.

Figure 13:
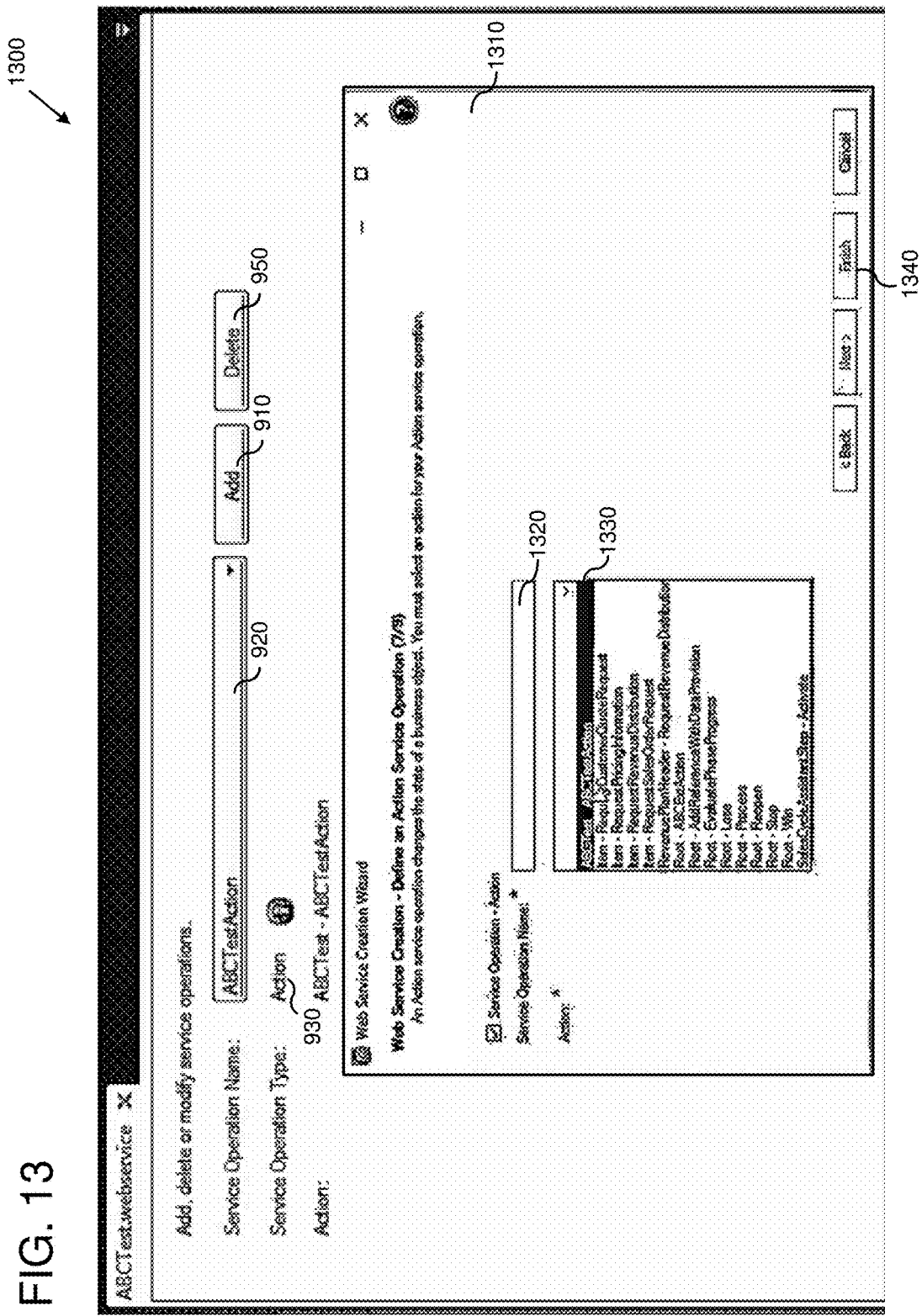
FIG. 13 is a diagram depicting an example user interface for defining an Action operation for a web service definition.

FIG. 13 is a diagram depicting an example user interface 1300 for defining an Action operation for a web service definition. The label 930 indicates that the type of the service operation is an Action operation. A dialog window 1310 comprises user interface components for providing a name for the Action operation and for selecting an action to be associated with the Action operation. A textbox 1320 can be used by a user to enter a name for the Action operation. A drop-down list 1330 can be used by a user to select an action to be executed when the Action operation is invoked. The drop-down list 1330 can be populated with a list of actions stored in an action repository. The action repository can contain one or more action definitions written in a declarative language (such as the Structured Query Language) and/or an imperative programming language (such as JAVA, JAVASCRIPT, etc.). The selected action can be executed by a runtime engine and/or a database management system with access to the action repository and a data store containing one or more LDO instances. In a particular embodiment, the selected action is configured to manipulate and/or aggregate data contained in one or more LDO instances in a data store based on one or more parameters that are provided in a data payload of a web service request. A button 1340 can be interacted with by a user to save the Query operation definition.

Figure 14:
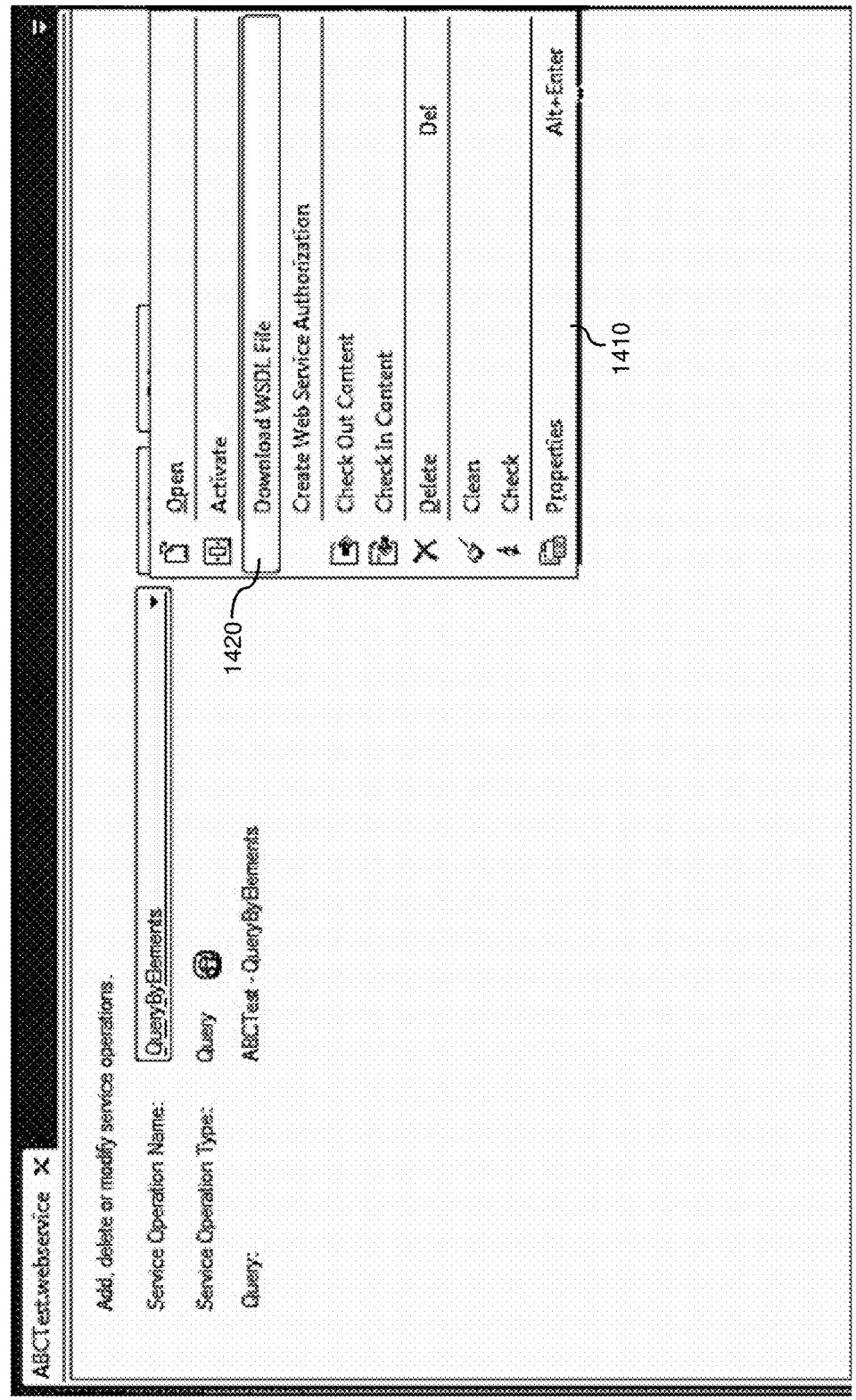
FIG. 14 is a diagram depicting an example user interface for downloading a web service definition schema for a logical data object web service.

FIG. 14 is a diagram depicting an example user interface 1400 for downloading a web service definition schema for a logical data object web service. A context menu 1410 is displayed that contains a menu item 1420 which, when selected by a user, allows the user to download a web service definition schema for a LDO web service. When the menu item 1420 is selected, the LDO web service definition schema can be retrieved from an application server. In a different or further embodiment, the LDO web service definition schema can be generated dynamically based on the definition for the web service. In a particular embodiment, the LDO web service definition schema can be written using the Web Service Definition Language (WSDL).

Figure 15:
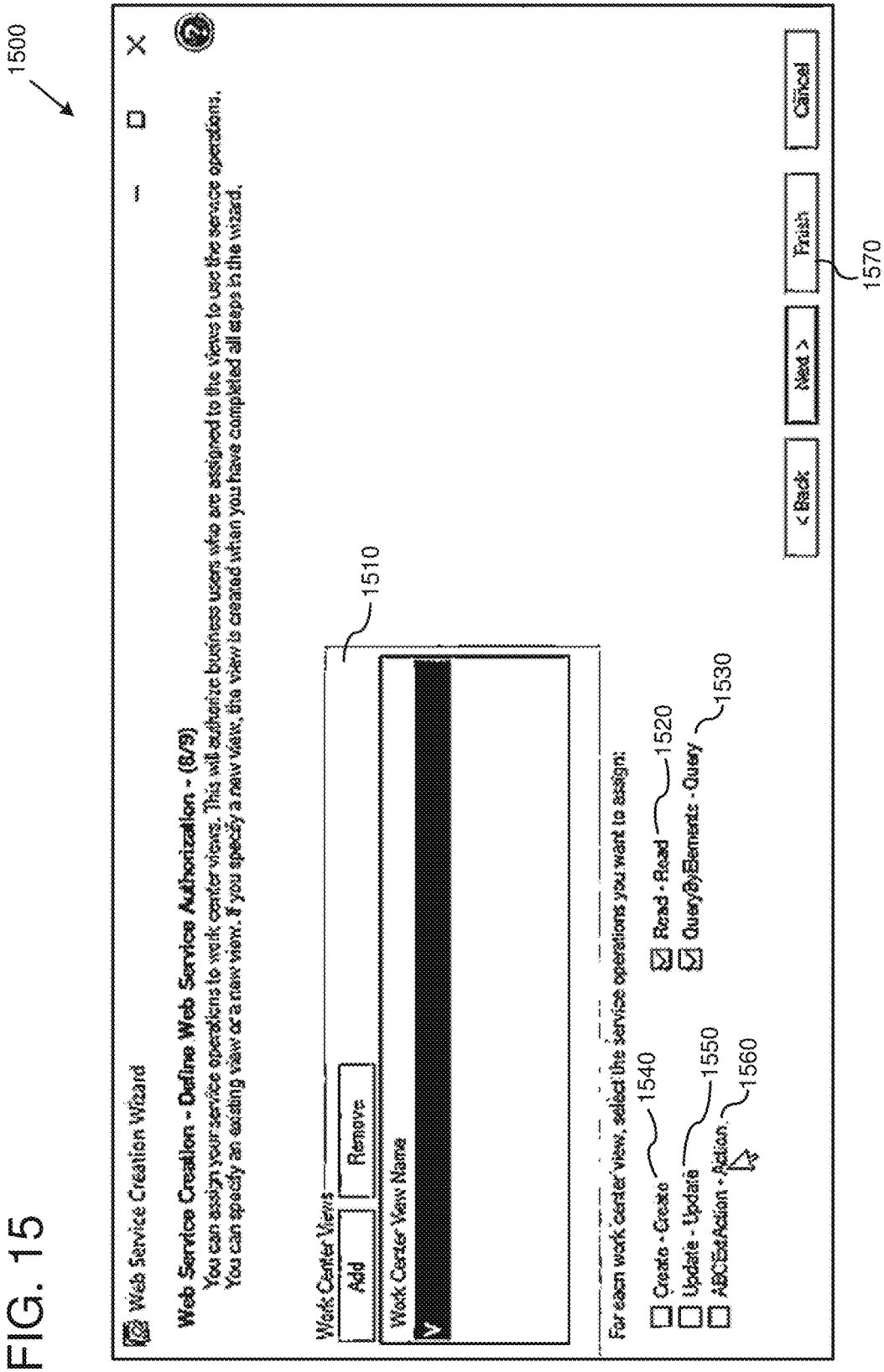
FIG. 15 is a diagram depicting an example user interface for defining authorization restrictions for a web service definition.

FIG. 15 is a diagram depicting an example user interface 1500 for defining authorization restrictions for a web service definition. A listbox 1510 can be used to add users and/or groups of users (sometimes referred to as "work center views"). A user or group of users in the list can be selected. Once a user or group of user has been selected, check boxes 1520-1560 can be selected to grant the selected user or group of users permission to invoke service operations associated with the checkboxes. In FIG. 15, a user group "V" is depicted as selected and checkboxes 1520 and 1530 are selected, indicating that users in the group "V" have permission to invoke the "Read-Read" operation and the "QueryByElements-Query" operation on the web service. Although five checkboxes 1520-1560 are depicted in FIG. 15, different numbers of checkboxes can be displayed when different numbers of service operations are defined. In at least one embodiment, a checkbox can be displayed for each service operation defined in a web service definition. A name of a service operation can be displayed in a label beside the checkbox with which it is associated. In a different or further embodiment, a label beside a checkbox can display an operation type of the operation associated with the checkbox. A button 1570 can be interacted with by a user to save the authorization restrictions.

Example 9—Example Web Service Requests

In any of the examples described herein, web service requests can be provided to request LDO web service operations and/or operations on extension node service interfaces. Any of the example systems described herein can be used to create, transmit, and process the example web service requests described herein.

FIG. 16 is a diagram depicting an example web service operation request 1600 to perform an Update operation using a logical data object instance. The example web service operation request 1600 contains an element 1610 that identifies an update web service operation. The element 1610 can contain, for example, a name or unique identifier associated with the service operation. The element 1610 contains an element 1620 that represents a root node of a LDO associated with the web service. The element 1620 contains a child element 1630 identifying a sub-node of the LDO object. In at least one embodiment the sub-node can be an extension node of the LDO object. The element 1630 contains one or more elements 1650-1670 associated with data elements of the sub-node. The elements 1650-1670 contain values that can be assigned to data element instances of an instance of the LDO. Optionally, one or more of the element values can be used as an identifier to look up one the LDO instance to be updated. The element 1630 includes an attribute 1640 that indicates the type of operation to be performed on the data elements of the sub-node. A value of "01" of the attribute 1640 can indicate, in this case, that an update operation is to be performed. Other values can be used to indicate other types of operations. In a scenario where multiple sub-node elements are included in the root node element 1620, different operation codes can be provided for different sub-nodes. For example, data elements instances for one or more sub-node instances can be updated and one or more other sub-node instances can be added to the LDO instance.

FIG. 17 is a diagram depicting an example web service operation request 1700 to perform an Action operation using a logical data object instance. The example web service operation request 1700 includes an element 1710 that identifies the Action operation that is requested. A message header element 1720 can contain parameter elements (e.g., 1722-1728) to be provided as input to the Action operation. A parameter element can be used, for example, to provide an identifier of a LDO instance to be targeted by the Action operation. An element 1730 represents a root node of a LDO associated with the web service. The element 1730 contains a child element 1740 identifying a sub-node of the LDO object and child elements 1732-1734 associated with data elements of the root node. In at least one embodiment, the sub-node can be an extension node of the LDO object. The element 1740 contains one or more elements 1742-1744 associated with data elements of the sub-node. The elements 1732-1734 and 1742-1744 can contain values of data element instances of an instance of the LDO. Optionally, one or more of the data element values can be provided as input to the Action operation. In a particular embodiment, the root node element 1730 can be deserialized to generate an object graph that can be provided as input to the Action operation. In a different or further embodiment, one or more of the data elements can contain identifiers associated with LDO node instances that can be used by the Action operation to look up the identified one or more node instances in a data store. Although a single sub-node element 1740 is depicted, it is possible for more than one sub-node element to be provided.

FIG. 18 is a diagram depicting an example web service operation request 1800 to perform a Query operation to retrieve one or more logical data object instances. The example web service operation request 1800 includes an element 1810 that identifies a Query service operation request. An element 1820 identifies a query to be executed by the Query operation. A predicate element 1830 identifies criteria to be provided to the Query operation for selecting one or more LDO instances from a data store. The predicate element 1830 defines a predicate for selecting LDO instances based on values of "ExtID" data element instances, however other types of predicate elements are also possible.

The predicate element 1830 contains criteria that can control the behavior of the query operation. A "LowerBoundaryExtID" selector element 1836 contains a numerical value and indicates that LDO instances with "ExtID" data element instances with values greater than the specified numerical value should be selected. Other types of selector elements are also possible. For example, an "UpperBoundaryExtID" selector element can be provided instead of, or in addition to, the "LowerBoundaryExtID" selector element 1836 to specify a maximum "ExtID" data element instance value.

The particular data element that is the focus of the query operation can be specified in the query definition for the query identified by the element 1820. Additionally or alternatively, the query identifier specified in the element 1820 can indicate a node to which the target data element belongs. For instance, the query identifier "OpportunityABCTestSimpleSelectionBy" can indicate that the target data element "ExtID" belongs to an "ABCTest" node that is a sub-node of an "Opportunity" root node of a LDO. In such a scenario, instances of the LDO with "ABCTest" sub-node instances with "ExtID" element instances with values that meet the criteria of the predicate element 1830 can be selected as query results. In at least one embodiment, the "ABCTest" sub-node is an extension node and the "ExtID" data element is an extension data element.

An "ExclusionInclusionCode" element 1832 indicates whether LDO instances that match the selector element 1836 should be included or excluded from the query results. A value of "I" can indicate that matching LDO instances should be included in the query results and a value of "E" can indicate the matching LDO instances should be excluded from the query results. An "IntervalBoundaryTypeCode" element 1834 can modify the behavior of the provided one or more boundary selector elements (e.g., "LowerBoundaryExtID" element 1836). In particular embodiment, various values of the element 1834 can modify the behavior of one or more boundary selector elements according to Table 1.

TABLE 1

Example IntervalBoundaryTypeCode Values

| Value | Description |
| --- | --- |
| 1 | Data element instance values equal to a value of a boundary selector element should be selected. |
| 2 | Data element instance values between an upper boundary and lower boundary, exclusive of the upper boundary, should be selected. |
| 3 | Data element instance values between an upper boundary and lower boundary, inclusive of both boundaries, should be selected. |
| 4 | Data element instance values between an upper boundary and lower boundary, exclusive of both boundaries, should be selected. |
| 5 | Data element instance values between an upper boundary and lower boundary, exclusive of the lower boundary, should be selected. |
| 6 | Data element instance values less than a boundary selector element should be selected. |
| 7 | Data element instance values less than or equal to a boundary selector element should be selected. |
| 8 | Data element instance values greater than a boundary selector element should be selected. |
| 9 | Data element instance values greater than or equal to a boundary selector element should be selected. |

The criteria elements 1832-1836 described herein are provided for illustration purposes and other types of predicate criteria elements are possible. Although a single predicate element 1830 is depicted, additional and/or different predicate elements can be provided. For example, a different predicate element can be provided or selecting one or more LDO instances based on values of one or more instances of one or more different data elements. In a particular embodiment, when more than one predicate element is provided, one or more LDO instances can be selected that satisfy the criteria specified in all of the one or more predicate elements.

A "ProcessingConditions" element 1840 can contain one or more processing condition elements (e.g., 1842-1844) that can modify the processing behavior of the query operation. A "QueryHitsUnlimitedIndicator" element 1844 can indicate whether a number of results returned by the query operation should be limited. A value of "false" can indicate that all results of the query should be returned and a value of "true" can indicate that the number of returned results should be limited. If the number of results returned should be limited, a "QueryHitsMaximumNumberValue" element 1842 can contain a value indicating a maximum number of results. In a particular embodiment, if a number of LDO instances that are retrieved is greater than the value of the element 1842, one or more of the results can be discarded to reduce the number of results returned to a number equal to the value of the element 1842.

Example 10—Example Computing Systems

Figure 19:
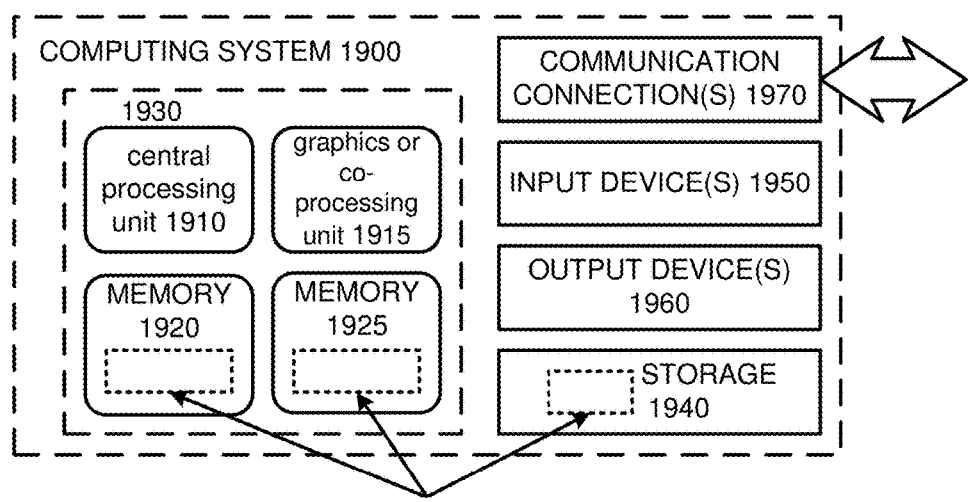
FIG. 19 is a block diagram of an example computing system in which some described embodiments can be implemented.

FIG. 19 depicts a generalized example of a suitable computing system 1900 in which the described innovations may be implemented. The computing system 1900 is not intended to suggest any limitation as to scope of use or functionality, as the innovations may be implemented in diverse general-purpose or special-purpose computing systems.

With reference to FIG. 19, the computing system 1900 includes one or more processing units 1910, 1915 and memory 1920, 1925. In FIG. 19, this basic configuration 1930 is included within a dashed line. The processing units 1910, 1915 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 19 shows a central processing unit 1910 as well as a graphics processing unit or co-processing unit 1915. The tangible memory 1920, 1925 may be volatile memory (e.g., registers, cache, RAM), non-volatile memory (e.g., ROM, EEPROM, flash memory, solid state drives, etc.), or some combination of the two, accessible by the processing unit(s). The memory 1920, 1925 can store software 1980 implementing one or more innovations described herein, in the form of computer-executable instructions suitable for execution by the processing unit(s).

A computing system may have additional features. For example, the computing system 1900 includes storage 1940, one or more input devices 1950, one or more output devices 1960, and one or more communication connections 1970. An interconnection mechanism (not shown) such as a bus, controller, or network interconnects the components of the computing system 1900. Typically, operating system software (not shown) provides an operating environment for other software executing in the computing system 1900, and coordinates activities of the components of the computing system 1900.

The tangible storage 1940 may be removable or non-removable, and includes magnetic disks, magnetic tapes or cassettes, solid state drives, CD-ROMs, DVDs, or any other medium which can be used to store information in a non-transitory way and which can be accessed within the computing system 1900. The storage 1940 can store instructions for the software 1980 implementing one or more innovations described herein.

The input device(s) 1950 may be a touch input device such as a keyboard, mouse, pen, or trackball, a voice input device, a scanning device, or another device that provides input to the computing system 1900. For video encoding, the input device(s) 1950 may be a camera, video card, TV tuner card, or similar device that accepts video input in analog or digital form, or a CD-ROM or CD-RW that reads video samples into the computing system 1900. The output device(s) 1960 may be a display, printer, speaker, CD-writer, or another device that provides output from the computing system 1900.

The communication connection(s) 1970 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 11—Example Cloud Computing Environment

Figure 20:
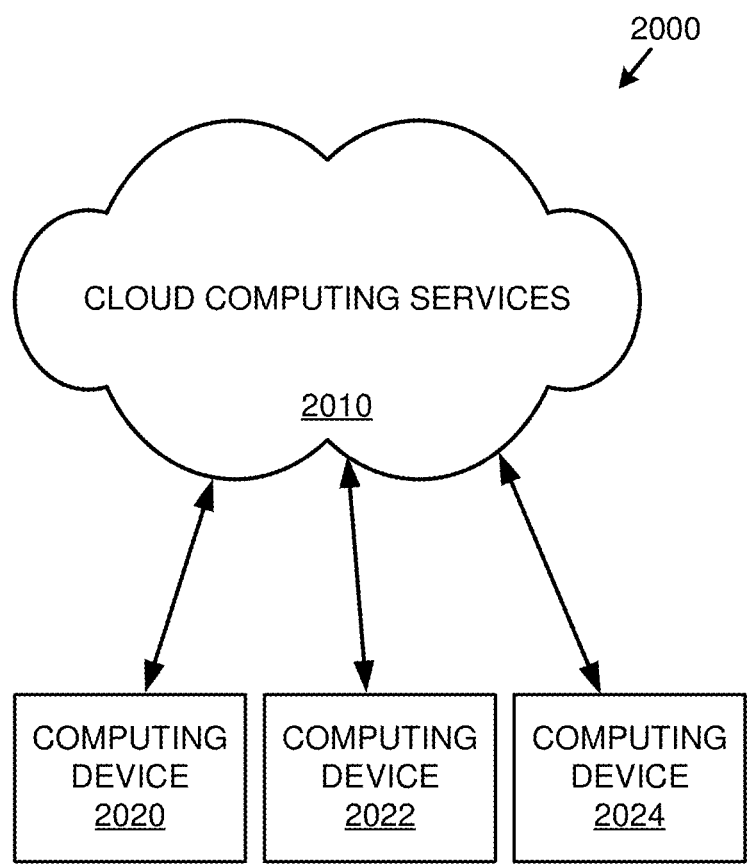
FIG. 20 is an example cloud computing environment that can be used in conjunction with the technologies described herein.

FIG. 20 depicts an example cloud computing environment 2000 in which the described technologies can be implemented. The cloud computing environment 2000 comprises cloud computing services 2010. The cloud computing services 2010 can comprise various types of cloud computing resources, such as computer servers, data storage repositories, networking resources, etc. The cloud computing services 2010 can be centrally located (e.g., provided by a data center of a business or organization) or distributed (e.g., provided by various computing resources located at different locations, such as different data centers and/or located in different cities or countries).

The cloud computing services 2010 are utilized by various types of computing devices (e.g., client computing devices), such as computing devices 2020, 2022, and 2024. For example, the computing devices (e.g., 2020, 2022, and 2024) can be computers (e.g., desktop or laptop computers), mobile devices (e.g., tablet computers or smart phones), or other types of computing devices. For example, the computing devices (e.g., 2020, 2022, and 2024) can utilize the cloud computing services 2010 to perform computing operators (e.g., data processing, data storage, and the like).

Example 11—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media and executed on a computing device (e.g., any available computing device, including smart phones or other mobile devices that include computing hardware). Computer-readable storage media can include any tangible media that can be accessed within a computing environment (e.g., one or more optical media discs such as DVD or CD, volatile memory components (such as DRAM or SRAM), or non-volatile memory components (such as flash memory, solid state drives, or magnetic media such as hard drives)). By way of example and with reference to Fig. 19, computer-readable storage media include memory 1920 and 1925, and storage 1940. The term computer-readable storage media does not include signals and carrier waves. In addition, the term computer-readable storage media does not include communication connections (e.g., 1970).

For example, input circuits, neuron circuits and synapse circuits, as described herein, can be emulated and/or simulated using computer-executable instructions executed on traditional computing hardware.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

The disclosed technology is not limited to any specific computer language or program. For instance, the disclosed technology can be implemented by software written in C++, Java, Perl, JavaScript, assembly language, or any other suitable programming language. Likewise, the disclosed technology is not limited to any particular computer or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technologies may be applied, it should be recognized that the illustrated embodiments are examples of the disclosed technologies and should not be taken as a limitation on the scope of the disclosed technologies. Rather, the scope of the disclosed technologies includes what is covered by the scope and spirit of the following claims.

What is claimed is:

1. A method for processing web service requests using logical data object extension nodes, the method comprising:
    receiving an extension node web service definition from a design time client computing device, wherein the extension node web service definition comprises a definition of a view of a logical data object, wherein:
        the logical data object comprises a hierarchical data structure comprising a plurality of nodes and associated data elements, and
        the view identifies a subset of the nodes of the hierarchical data structure of the logical data object;
    generating an extension node service interface using the extension node web service definition, wherein the extension node service interface's access to the hierarchical data structure of the logical data object is limited to the subset of nodes of the logical data object that are identified by the definition of the view;
    receiving a web service request comprising a service identifier and an operation identifier;
    determining that the extension node service interface is associated with the service identifier; and
    performing an operation associated with the operation identifier using a logical data object extension node associated with the extension node service interface, wherein the scope of the operation is constrained to the subset of nodes of the hierarchical data structure of the logical data object identified by the definition of the view.

2. The method of claim 1, wherein the extension node service definition further comprises:
    one or more operations that can be performed using the view of the logical data object via one or more web service requests.

3. The method of claim 2, wherein:
    the web service request identifies one or more data elements and/or sub-nodes of the logical object that are a target of the operation associated with the operation identifier; and
    the method further comprises:
        validating the web service request by determining that the one or more elements and/or sub-nodes identified by the web request are contained within the definition of the view of the logical data object before performing the operation associated with the operation identifier.

4. The method of claim 1, wherein:
    the extension node web service definition comprises one or more operation definitions;
    generating the extension node service interface comprises creating one or more interface operations based on the one or more operation definitions; and
    the operation associated with the operation identifier is one of the one or more interface operations.

5. The method of claim 4, wherein:
    an operation definition for the interface operation associated with the operation identifier identifies one or more users authorized to invoke the interface operation;
    the web service request further comprises a user identifier; and
    the method further comprises determining that the user identifier is associated with one of the authorized users before performing the operation.

6. The method of claim 1, further comprising:
    generating a web service definition schema based on the extension node service interface;
    receiving a request for the web service definition schema from a service consumer; and
    transmitting the web service definition schema to the service consumer.

7. The method of claim 1, wherein the operation associated with the operation identifier is an operation to create, read, update, or delete the logical data object extension node instance.

8. One or more computer-readable media storing instructions that, when executed by one or more processors, cause the one or more processors to perform a method, the method comprising:
    receiving a definition for a logical data object web service from a first computing device over a network, wherein the definition for the logical data object web service identifies a subset of nodes contained within a hierarchical data structure of a logical data object;
    generating a logical data object web service based on the received definition, wherein the logical data object web service's access to the hierarchical data structure of the logical data object is limited to the identified subset of nodes of the logical data object;
    receiving a web service operation request from a second computing device over the network, wherein the web service operation request comprises a web service endpoint identifier and an operation identifier;
    determining that the web service endpoint identifier is associated with the logical data object web service;
    identifying an operation of the logical data object web service associated with the operation identifier;
    performing the operation of the logical data object web service using a data payload of the web service operation request, wherein the scope of the operation is constrained to the identified subset of nodes of the hierarchical data structure of the logical data object; and transmitting a result of the operation in a web service response to the second computing device.

9. The one or more computer-readable media of claim 8, wherein the method further comprises:
receiving an extension node definition for a logical data object;
processing the extension node definition to add one or more extension sub-nodes to the logical data object; and
wherein the operation of the logical data object web service is performed using the one or more extension sub-nodes.

10. The one or more computer-readable media of claim 8, wherein performing the operation of the logical data object web service comprises accessing one or more instances of a logical data object associated with the logical data object web service.

11. The one or more computer-readable media of claim 8, wherein the method further comprises:
receiving a request from the second computing device for a schema for the logical data object web service;
generating a web service schema for the logical data object web service; and
transmitting the generated web service schema to the second computing device.

12. The one or more computer-readable media of claim 11, wherein:
the web service schema comprises a Web Service Definition Language schema; and
the web service operation request is a Simple Object Access Protocol request.

13. The one or more computer-readable media of claim 8, wherein:
the data payload of the web service operation request identifies multiple instances of a logical data object associated with the logical data object web service; and
performing the operation of the logical data object web service comprises retrieving each of the identified instances of the logical data object.

14. The one or more computer-readable media of claim 8, wherein:
the definition for the logical data object web service comprises one or more user identifiers for users authorized to access the logical data object web service; and
the method further comprises:
identifying a user associated with the web service operation request, and
determining that the user is authorized to access the logical data object web service before performing the operation of the logical data object web service.

15. The one or more computer-readable media of claim 8, wherein the method further comprises:
receiving a selection of one or more nodes of a logical data object via a user interface of the first computing device; and
generating the definition for the logical data object web service based on the selection.

16. The one or more computer-readable media of claim 8, wherein:
the data payload of the web service operation request comprises one or more query criteria; and
performing the operation of the logical data object web service comprises retrieving one or more instances of a logical data object from a data store that are associated with the web service and that satisfy the one or more query criteria.

17. The one or more computer-readable media of claim 8, wherein:
the web service operation request is a Hypertext Transfer Protocol request; and
the endpoint identifier comprises a Uniform Resource Locator.

18. A system for creating and running a web service using an extension node, the system comprising:
a repository service configured to:
receive a design document comprising a definition of an extension node for a hierarchical data structure of a logical data object, wherein the extension node comprises one or more data elements,
store the definition of the extension node in a design document store in association with at least one design document for the logical data object, and
receive a web service definition for the logical data object, wherein the web service definition identifies the extension node and defines one or more web service operations that can be performed using one or more instances of the logical data object; and
a runtime engine configured to:
generate an extension node web service interface based on the web service definition that supports the defined web service operations, wherein the extension node web service interface's access to the hierarchical data structure of the logical data object is limited to the extension node identified in the web service definition,
receive a web service request comprising an endpoint identifier associated with the extension node web service interface and an operation identifier associated with one of the defined web service operations,
process the web service request using the extension node web service interface, wherein the scope of the operation is constrained to the extension node identified in the web service definition and the processing comprises performing the identified operation using an instance of the extension node associated with an instance of the logical data object stored in a logical data object store, and
transmit a web service response comprising a result of the operation.

* * * * *